United States Patent [19]
Kroeker et al.

[11] Patent Number: 5,369,726
[45] Date of Patent: * Nov. 29, 1994

[54] SPEECH RECOGNITION CIRCUITRY EMPLOYING NONLINEAR PROCESSING SPEECH ELEMENT MODELING AND PHONEME ESTIMATION

[75] Inventors: John P. Kroeker, Beverly; Robert L. Powers, Topsfield, both of Mass.

[73] Assignee: Eliza Corporation, Beverly, Mass.

[ * ] Notice: The portion of the term of this patent subsequent to Dec. 1, 2009 has been disclaimed.

[21] Appl. No.: 15,299

[22] Filed: Feb. 9, 1993

Related U.S. Application Data

[63] Continuation of Ser. No. 775,804, Oct. 11, 1991, abandoned, which is a continuation of Ser. No. 395,449, Aug. 17, 1989, Pat. No. 5,168,524.

[51] Int. Cl.$^5$ .............................................. G10L 5/06
[52] U.S. Cl. .................................. 395/2.45; 381/41; 381/43
[58] Field of Search ............... 381/43, 41; 395/2, 2.45

[56] References Cited

U.S. PATENT DOCUMENTS

| | | | |
|---|---|---|---|
| 3,727,193 | 4/1973 | Bolie . | |
| 4,156,868 | 5/1979 | Levinson | 382/1 |
| 4,227,177 | 10/1980 | Moshier . | |
| 4,241,329 | 12/1980 | Bahler et al. . | |
| 4,277,644 | 7/1981 | Levinson et al. | 395/2.5 |
| 4,400,788 | 8/1983 | Myers et al. . | |
| 4,400,828 | 8/1983 | Pirz et al. | 395/2.47 |
| 4,412,098 | 10/1983 | An . | |
| 4,592,085 | 5/1986 | Watari et al. | 395/2.63 |
| 4,597,098 | 6/1986 | Noso | 381/46 |
| 4,601,054 | 7/1986 | Watari et al. | 395/2.47 |
| 4,606,069 | 8/1986 | Johnsen | 382/56 |
| 4,624,010 | 11/1986 | Takebayashi | 381/43 |
| 4,696,041 | 9/1987 | Sakata . | |
| 4,712,243 | 12/1987 | Ninomiya et al. | 381/43 |
| 4,715,004 | 12/1987 | Kabasawa et al. | 395/2.61 |
| 4,718,092 | 1/1988 | Klovstad | 381/43 |
| 4,718,093 | 1/1988 | Brown | 381/43 |
| 4,723,290 | 2/1988 | Watanabe et al. | 395/2.63 |
| 4,813,074 | 3/1989 | Marcus | 395/2 |
| 4,908,865 | 3/1990 | Doddington et al. | 381/43 |
| 4,941,178 | 7/1990 | Chuang . | |
| 4,962,535 | 10/1990 | Kimura et al. . | |
| 5,168,524 | 12/1992 | Kroeker et al. | 381/43 |

OTHER PUBLICATIONS

Duda & Hart, "Pattern Classification and Scene Analysis", pp. 130–138. New York: John Wiley & Sons.

Hiraoka, et al., "Compact Isolated Word Recognition System for Large Vocabulary," ICASSP 86, Tokyo pp. 69–72.

DeMori, et al., "Use of Fuzzy Algorithms for Phonetic and Phonemic Labeling of Continuous Speech," IEEE Trans. Pattern Analysis and Machine Intelligence, vol. PAMI-2, No. 2, Mar. 1980, pp. 136–148.

Makino, et al., "Automatic Labeling System Using (List continued on next page.)

Primary Examiner—Allen R. MacDonald
Assistant Examiner—Richard J. Kim
Attorney, Agent, or Firm—Cesari and McKenna

[57] ABSTRACT

A phoneme estimator in a speech-recognition system includes energy detect circuitry for detecting the segments of a speech signal that should be analyzed for phoneme content. Speech-element processors then process the speech signal segments, calculating nonlinear representations of the segments. The nonlinear representation data is applied to speech-element modeling circuitry which reduces the data through speech element specific modeling. The reduced data are then subjected to further nonlinear processing. The results of the further nonlinear processing are again applied to speech-element modeling circuitry, producing phoneme isotype estimates. The phoneme isotype estimates are rearranged and consolidated, that is, the estimates are uniformly labeled and duplicate estimates are consolidated, forming estimates of words or phrases containing minimal numbers of phonemes. The estimates may then be compared with stored words or phrases to determine what was spoken.

2 Claims, 50 Drawing Sheets

OTHER PUBLICATIONS

Speaker-Dependent Phonetic Unit References," ICASSP 86, Tokyo pp. 2783–2786.

Haton, et al., "Extraction de Parametres et Compression de l'information; Application a la Reconnaissance de la Parole," Comptes Rendus Hebdomadaires des Seance de l'Academie des Sciences, vol. 273, Part A, No. 10, Sep. 6, 1971, pp. 415–418.

Pardo, "On the Determination of Speech Boundaries: A Tool for Providing Anchor Time Points in Speech Recognition" ICASSP 86, Tokyo pp. 2267–2270.

Ukita, et al., "A Speaker Independent Recognition Algorithm for Connected Word Using Word Boundary Hypothesizer" ICASSP 86, Tokyo pp. 1077–1080.

Marmarelis & Marmarelis, "Analysis of Physiological Systems," pp. 131–171. New York, Plenum Press.

von J. Schurmann and Becker, D., "Spracherkennung mit Quadratmittel-Polynomklassifikatoren" (Speech recognition by means of mean square polynomial classification), Elektronische Rechenanlagen 20. Jahrgang 1978 Heft 1 and Heft 2 pp. 15–23.

Hess, W. J., "A Pitch-Synchronous Digital Feature Extraction System for Phonemic Recognition of Speech", IEEE Transactions on Acoustics, Speech, and Signal Processing, vol. ASSP-24, No. 1, Feb. 1976 pp. 14–25.

Zelinski, R. and Class, F., "A Segmentation Algorithm For Connected Word Recognition Based on Estimation Principles", IEEE Transactions on Acoustics, Speech, and Signal Processing, vol. ASSP-31, No. 4, Aug. 1983, pp. 818–827.

Zwicker, E. and Terhardt, F., "Automatic Speech Recognition Using Psychoacoustic Models", J. Acoust. Soc. Am 65(2), Feb. 1979 pp. 487–498.

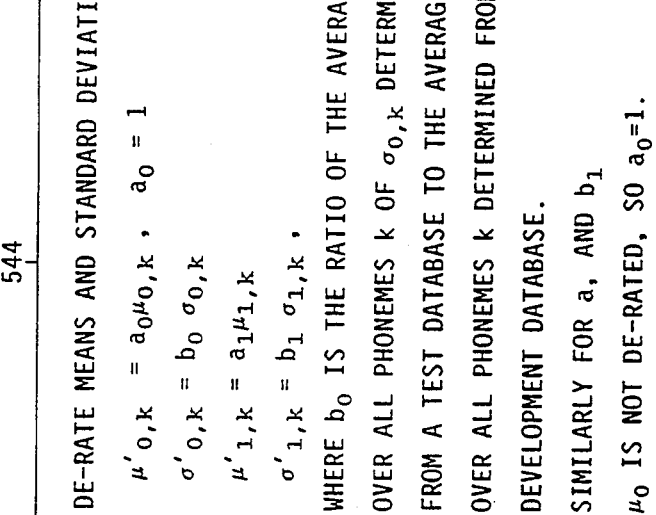
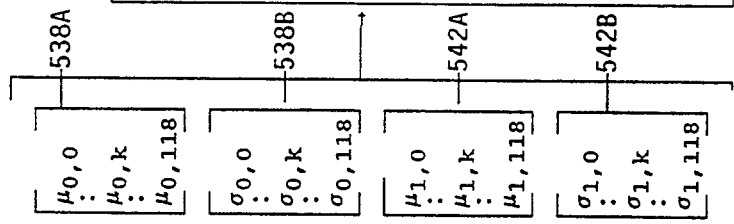
FIG. 34

TABLE 1.

| VOWELS | EXAMPLE |
|---|---|
| a | father |
| ae | had |
| c | saw |
| E | get |
| i | seek |
| I | sit |
| oU | open |
| u | you |
| U | foot |
| ^ | up |

| DIPTHONGS | EXAMPLE |
|---|---|
| aI | time |
| aU | how |
| cI | boy |
| eI | eight |
| o^ | (combination of 'oU' and '^', heard often at the beginning of 'cI' when listening to short speech segments) |

| NASALIZED VOWELS | EXAMPLE |
|---|---|
| EN | entry (combination of 'E' and 'N') |
| IN | in (combination of 'I' and 'N') |

| RHOTICIZED VOWELS | EXAMPLE |
|---|---|
| aR | are |
| eR | air |
| iR | ear |
| oR | or |

| NASALIZED FINAL CONSONANTS | EXAMPLE |
|---|---|
| Nd | bend |
| Nt | bent |

FIG. 36A

TABLE 1 (CONTINUED).

| FINAL FORM | BRIDGE FORM | INITIAL FORM | EXAMPLE OF THE INITIAL FORM |
|---|---|---|---|
| _b | _b_ | b | boy |
| _ch |  | ch | cheese |
| _d | _d_ | d | day |
| _dZ |  | dZ | 'j' in join |
| _f | _f_ | f | fit |
| _g | _g_ | g | go |
|  |  | h | how |
| J |  | j | 'y' in you ('J' is the beginning of 'ee-you') |
| _k | _k_ | k | keep |
| L | _l_ | l | light |
| M | _m_ | m | my |
| N | _n_ | n | new |
| ng |  |  | wing (final form) |
| _p | _p_ | p | pass |
| R | _r_ | r | row |
| _s | _s_ | s | sit |
| _sh |  | sh | shout |
| _t | _t_ | t | to |
| _th |  | th | thunder |
| _v | _v_ | v | voice |
| W | _w_ | w | wait |
| _x |  | 'x' | in six (final form) |
| _z | _z_ | z | zoo |
| _# | _#_ | # | 'th' in this |

| SCHWA | EXAMPLE |
|---|---|
| * | (unstressed vowel, as 'a' in 'about') |

FIG. 36B

TABLE 2.

| DIPHONE LABEL | FIRST PHONEME LABEL | SECOND PHONEME LABEL |
|---|---|---|
| dR | d | R |
| EN | E | N |
| iR | i | R |
| IN | I | N |
| _x | _k | _s |
| Nd | N | _d |
| Nt | N | _t |
| pl | p | l |
| shN | sh | N |
| thR | th | R |
| vN | v | N |

FIG. 37

TABLE 3.

| PHONEME | ISOLATED FORM |
|---|---|
| ch | isol.ch |
| k | isol.k |
| p | isol.p |
| s | isol.s |
| t | isol.t |

FIG. 38

TABLE 4.

| DIPHONE LABEL | FIRST PHONEME LABEL | SECOND PHONEME LABEL |
|---|---|---|
| bi | b | i |
| di | d | i |
| dI | d | I |
| du | d | u |
| gr | g | r |
| jE | j | E |
| jR | j | R |
| ju | j | u |
| ki | k | i |
| kr | k | r |
| lE | l | E |
| li | l | i |
| meI | m e | I |
| nE | n | E |
| ni | n | i |
| pr | p | r |
| rE | r | E |
| ri | r | i |
| sE | s | E |
| sI | s | I |
| ta | t | a |
| ti | t | i |
| tr | t | r |
| tu | t | u |
| wI | w | I |

FIG. 39

TABLE 5.

| DIPHONE LABEL | FIRST PHONEME LABEL | SECOND PHONEME LABEL |
|---|---|---|
| aR | a | R |
| eR | eI | R |
| oR | oU | R |

FIG. 40

TABLE 6.

| SUB-CLASS OF PHONEME | INPUT PHONEME LABEL | OUTPUT PHONEME LABEL |
|---|---|---|
| Vowels | o^ | oU |
| Isolated phonemes | isol.ch<br>isol.k<br>isol.p<br>isol.s<br>isol.t | ch<br>k<br>p<br>s<br>t |
| Approximants and nasals | J<br>L<br>M<br>N<br>R<br>W | j<br>l<br>m<br>n<br>r<br>w |
| Final consonants | _b<br>_ch<br>_d<br>_dZ<br>_f<br>_g<br>_k<br>_p<br>_s<br>_sh<br>_t<br>_th<br>_v<br>_z<br>_# | b<br>ch<br>d<br>dZ<br>f<br>g<br>k<br>p<br>s<br>sh<br>t<br>th<br>v<br>z<br># |
| Bridges | _b_<br>_d_<br>_f_<br>_g_<br>_k_<br>_l_<br>_m_<br>_n_<br>_p_<br>_r_<br>_s_<br>_t_<br>_v_<br>_w_<br>_z_<br>_#_ | b<br>d<br>f<br>g<br>k<br>l<br>m<br>n<br>p<br>r<br>s<br>t<br>v<br>w<br>z<br># |

FIG. 41

```
a  ae  c   E  i  I  oU  u  U  ^
ai aU  cI eI o^
EN IN
aR eR  iR oR
Nd Nt
_b_         _b_              b
_ch                          ch
_d_         _d_              d
_dZ                          dZ
_f_         _f_              f
_g_         _g_              g
                             h
J                            j
_k_         _k_              k
L           _l_              l
M           _m_              m
N           _n_              n
ng
_p_         _p_              p
R           _r_              r
_s_         _s_              s
_sh                          sh
_t_         _t_              t
_th                          th
_v_         _v_              v
W           _w_              w
_x
_z_         _z_              z
_#_         _#_              #
``` dR pl shN thR vN
isol.ch isol.k isol.p isol.s isol.t

TABLE 7

FIG. 42

```
a   ae  c   E   i   I   oU  u   U^
ai  aU  cI  eI  o
EN  IN
aR  eR  iR  oR
Nd  Nt
_b          _b_         b
_ch                     ch
_d          _d_         d
_dZ                     dZ
_f          _f_         f
_g          _g_         g
                        h
J                       j
_k          _k_         k
L           _l_         l
M           _m_         m
N           _n_         n
ng
_p          _p_         p
R           _r_         r
_s          _s_         s
_sh                     sh
_t          _t_         t
_th                     th
_v          _v_         v
W           _w_         w
_x
_z          _z_         z
_#          _#_         #
dR  pl  shN ThR vN
isol.ch isol.k isol.p isol.s isol.t
bi
di  dI  du
gr
jE  jR  ju
ki  kr
lE  li
meI
nE  ni
pr
rE  ri
sE  sI
ta  ti  tr  tu
wI
```

TABLE 8

TABLE 9
FIG. 44

TABLE A.

| PROCESSING FIGURES | PARAMETER DEVELOPMENT FIGURES |
|---|---|
| POWER SPECTRUM ESTIMATION (FIG. 3) | ( NONE ) |
| POWER SPECTRUM REDUCTION (FIG. 4) | ( NONE ) |
| ENERGY DETECT PROCESSOR (FIG. 5) | ( NONE ) |
| RECEPTIVE FIELD PROCESSOR (FIG. 6) | ( NONE ) |
| ADAPTIVE NORMALIZER (FIG. 7) | FIXED NORMALIZATION-1 ( FIG. 19 ) |
| RECEPTIVE FIELD NONLINEAR PROCESSOR (FIGS. 8 AND 9) | ( NONE ) |
| NONLINEAR PROCESSOR-2 (FIG. 10) | EIGENMATRIX $E_{26}$ ( FIG. 22 ) USING MATRIX DEFINITIONS (FIGS. 20 AND 21) FIXED NORMALIZATION-2 ( FIG. 23 ) |
| NORMALIZATION PROCESSOR (FIG. 11, FIRST PART) | FIXED NORMALIZATION-3 ( FIG. 24 ) |
| SPEECH-ELEMENT MODEL-1 (FIG. 11, SECOND PART) | COMBINED KERNEL $K_1$ ( FIGS. 27 AND 28 ), USING MATRIX DEFINITIONS ( FIGS. 20 AND 21 ) AND LABELS ( FIGS. 25 AND 26 |
| FORM TRIPLE VECTORS (FIG. 12) | ( NONE ) |
| NONLINEAR PROCESSOR-3 (FIG. 13) | EIGENMATRIX $E_{33}$ ( FIG. 29 ), USING MATRIX DEFINITIONS ( FIGS. 20 AND 21 ) |
| SPEECH-ELEMENT MODEL-2 (FIG. 14, FIRST PART) | COMBINED KERNEL $K_2$, ( FIGS. 31 AND 32 ), USING MATRIX DEFINITIONS ( FIGS. 20 AND 21) AND LABELS ( FIGS. 25 AND 30 ) |
| LOGARITHM OF THE LIKELIHOOD RATIO (FIG. 14, SECOND PART) | POLYNOMINAL PARAMETERS ( FIGS. 33 AND 34 ), USING LABELS ( FIGS. 25 AND 30 ) |
| PHONEME ESTIMATE REARRANGEMENT (FIG. 15) | TABLES FOR DIPHONES AND PHONEME MAPS ( FIG. 35) |
| ESTIMATOR INTEGRATOR (FIGS. 16, 17 AND 18) | ( NONE ) |

FIG. 49

SPEECH RECOGNITION CIRCUITRY EMPLOYING NONLINEAR PROCESSING SPEECH ELEMENT MODELING AND PHONEME ESTIMATION

This application is a continuation of U.S. patent application Ser. No. 07/775,804, filed Oct. 11, 1991, now abandoned, which is a continuation of U.S. patent application Ser. No. 07/395,449, filed Aug. 17, 1989, now U.S. Pat. No. 5,168,524.

FIELD OF INVENTION

The invention is directed to speech recognition, and more particularly to those parts of speech recognition systems used in recognizing patterns in data-reduced versions of the speech. It is an improvement to the circuit disclosed in a co-pending application entitled "Speech-Recognition Circuitry Employing Phoneme Estimation" Ser. No. 036,380 filed Apr. 7, 1987 on behalf of the same inventors.

BACKGROUND OF THE INVENTION

Most systems for recognizing speech employ some means of reducing the data in raw speech. Thus the speech is reduced to representations that include less than all of the data that would be included in a straight digitization of the speech signal. However, such representations must contain most if not all of the data needed to identify the meaning intended by the speaker.

In development, or "training", of the speech-recognition system, the task is to identify the patterns in the reduced-data representations that are characteristic of speech elements such as words or phrases. The sounds made by different speakers uttering the same words or phrases are different, and thus the speech-recognition system must assign the same words or phrases to patterns derived from these different sounds. There are other sources of ambiguity in the patterns, such as noise and the inaccuracy of the modeling process, which may also alter the speech signal representations. Accordingly, routines are used to assign likelihoods to various mathematical combinations of the reduced-data representations of the speech, and various hypotheses are tested, to determine which one of a number of possible speech elements is most likely the one currently being spoken, and thus represented by a particular data pattern.

The processes for performing these operations tend to be computation-intensive. The likelihoods must be determined for various data combinations and large numbers of speech elements. Thus the limitation on computation imposed by requirements of, for instance, real-time operation of the system limit the sensitivity of the pattern-recognition algorithm that can be employed.

It is accordingly an object of the present invention to increase the computational time that can be dedicated to recognition of a given pattern but to do so without increasing the time required for the total speech-recognition process.

It is a further object of the invention to process together signal segments corresponding to a longer time period, that is, use a larger signal "window," without substantially increasing the computational burden and without decreasing the resolution of the signal data.

SUMMARY OF THE INVENTION

The foregoing and related objects are achieved in a speech-recognition system that includes a phoneme estimator which selectively reduces speech data by a first modeling operation, performs nonlinear data manipulations on the reduced data and selectively reduces the data by a second modeling operation. The reduced data are then further manipulated and re-arranged to produce phoneme estimates which are used to identify the words or phrases spoken.

In brief summary, the phoneme estimator monitors the energy of a data-reduced version of the input speech signal and selects for further processing all speech segments with energy which exceeds a certain threshold. Such signal segments typically represent voicing or unvoiced expiration within speech, and thus phonemes. The phoneme estimator then manipulates a further data-reduced representation of the signal segments through a series of speech modeling operations, nonlinear operations and further speech modeling operations to calculate which phoneme patterns the data most closely resemble.

The speech modeling is used to reduce the speech signal data by ignoring data which, through experience, are found to be relatively insignificant or redundant in terms of phoneme-pattern estimation. The more significant data are then manipulated using computation-intensive nonlinear operations resulting in data patterns which are used to determine the likelihood of the intended phonemes more accurately. The time required for such computations is minimized by so reducing the data.

The phoneme estimator also looks at the time between signal energy, or phoneme, detections in selecting the most likely phonemes. Considering the time between the phoneme detections, the estimator may concatenate what would otherwise be considered a series of distinct phonemes into a group of multi-phoneme patterns, for example, diphones. These multi-phoneme patterns often convey the intended meaning of the speech more clearly than the individual phonemes.

BRIEF DESCRIPTION OF THE DRAWINGS

For a more complete understanding of the features, advantages, and objects of the invention, reference should be made to the following detailed description and the accompanying drawings, in which:

FIGS. 33 and 34 illustrate the calculation of mean and standard deviation parameters which are used in calculating the logarithm of the likelihood ratio as illustrated in FIG. 14;

FIG. 36A and FIG. 36B together are a table of labels used in marking the speech as illustrated in FIG. 25;

FIG. 37 is a table of diphone and constituent phoneme labels to be used in the parameter calculations of FIGS. 26, 30 and 35;

FIG. 38 is a table of isolated forms of phonemes used in the parameter calculations depicted in FIGS. 26 and 30;

FIG. 39 is a table of diphones and constituent phonemes used in the parameter calculations depicted in FIGS. 30 and 35;

FIGS. 40 and 41 are tables of diphones and constituent phonemes to be used in determining the parameters depicted in FIG. 35;

FIG. 42 is a table of speech element labels used in speech-element model-1;

FIG. 43 is a table of phoneme isotype labels used in speech-element model-2;

FIG. 44 is a table of phoneme labels used in phoneme rearrangement processor 44 of FIG. 2;

FIG. 49 is a table explaining the relationship between the processing system figures, FIGS. 3–18, and the parameter development figures, FIGS. 19–35.

DETAILED DESCRIPTION OF AN ILLUSTRATIVE EMBODIMENT OVERVIEW

This specification describes, with reference to FIGS. 1–18, a processing system for recognizing speech. The parameters used in calculations performed by processors in the processing system and their development are described with reference to FIGS. 19–35 and the various tables shown in FIGS. 36–44. Hardware configurations of the processing system are described with reference to FIGS. 45–48.

Figure 1:
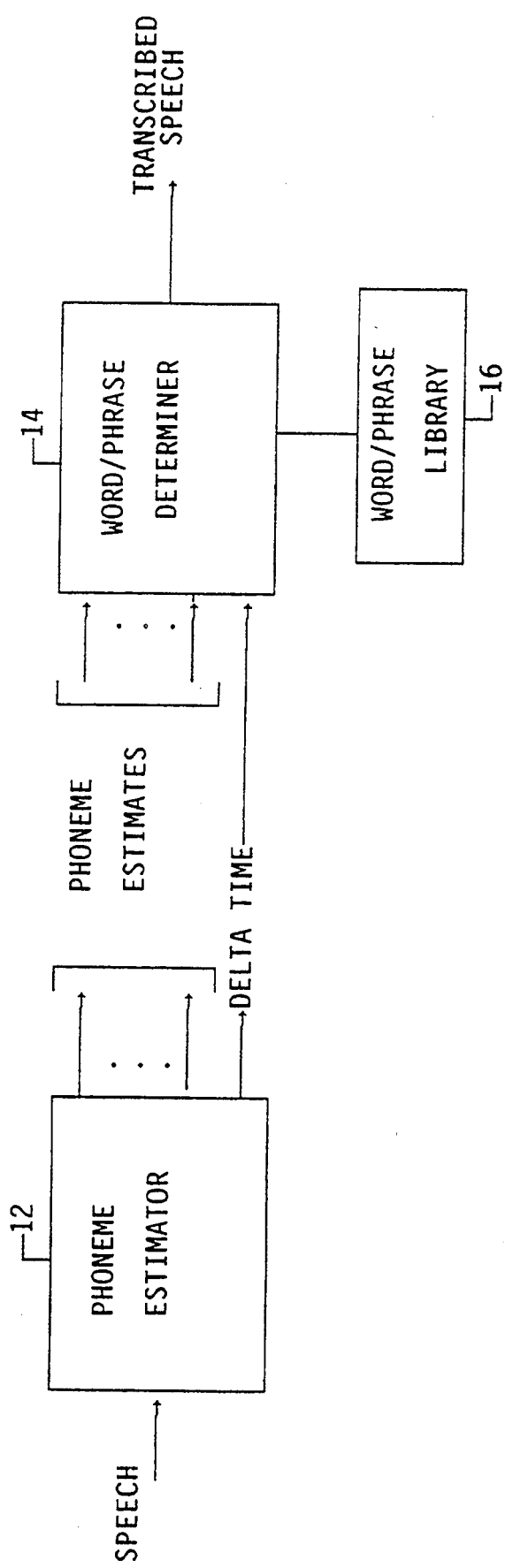
FIG. 1 is a block diagram of a speech-recognition system employing the teachings of the present invention.

With reference to FIG. 1, a speech recognition system 10 includes a phoneme estimator 12, a word/phrase determiner 14 and a word/phrase library 16. The phoneme estimator 12 receives a SPEECH input signal from, for example, a microphone or a telephone line. The phoneme estimator 12 senses the energy of the SPEECH input signal and determines whether the energy exceeds a predetermined threshold. If it does it indicates that speech, and thus phonemes, are present in the SPEECH signal. The phoneme estimator 12 then calculates corresponding phoneme estimates, that is, a group of output signals, each of which is an estimate of how likely it is that the SPEECH signal constitutes the phoneme associated with that output. The estimator also calculates the time between phoneme detections, that is, delta time.

The delta time values and the estimates are applied to the word/phrase determiner 14. The word/phrase determiner 14, using the time and estimate values, consults the word/phrase library 16, which contains words and phrases listed in terms of constituent phonemes. The word/phrase determiner 14 then assigns a word or phrase to the SPEECH signal and transcribes the speech. The output of the word/phrase determiner 14 may take other forms, for example, an indication of which of a group of possible expected answers has been spoken.

The details of the word/phrase determiner 14 will not be set forth here because the specific way in which the phoneme estimates are further processed is not part of the present invention. However, it is of interest that the word/phrase determiner 14 determines the meaning of the SPEECH input signal based strictly on the phoneme estimate values and the delta time values produced by the phoneme estimator 12, rather than on a more primitive form of data, for example, the raw speech or its frequency spectrum.

Figure 2:
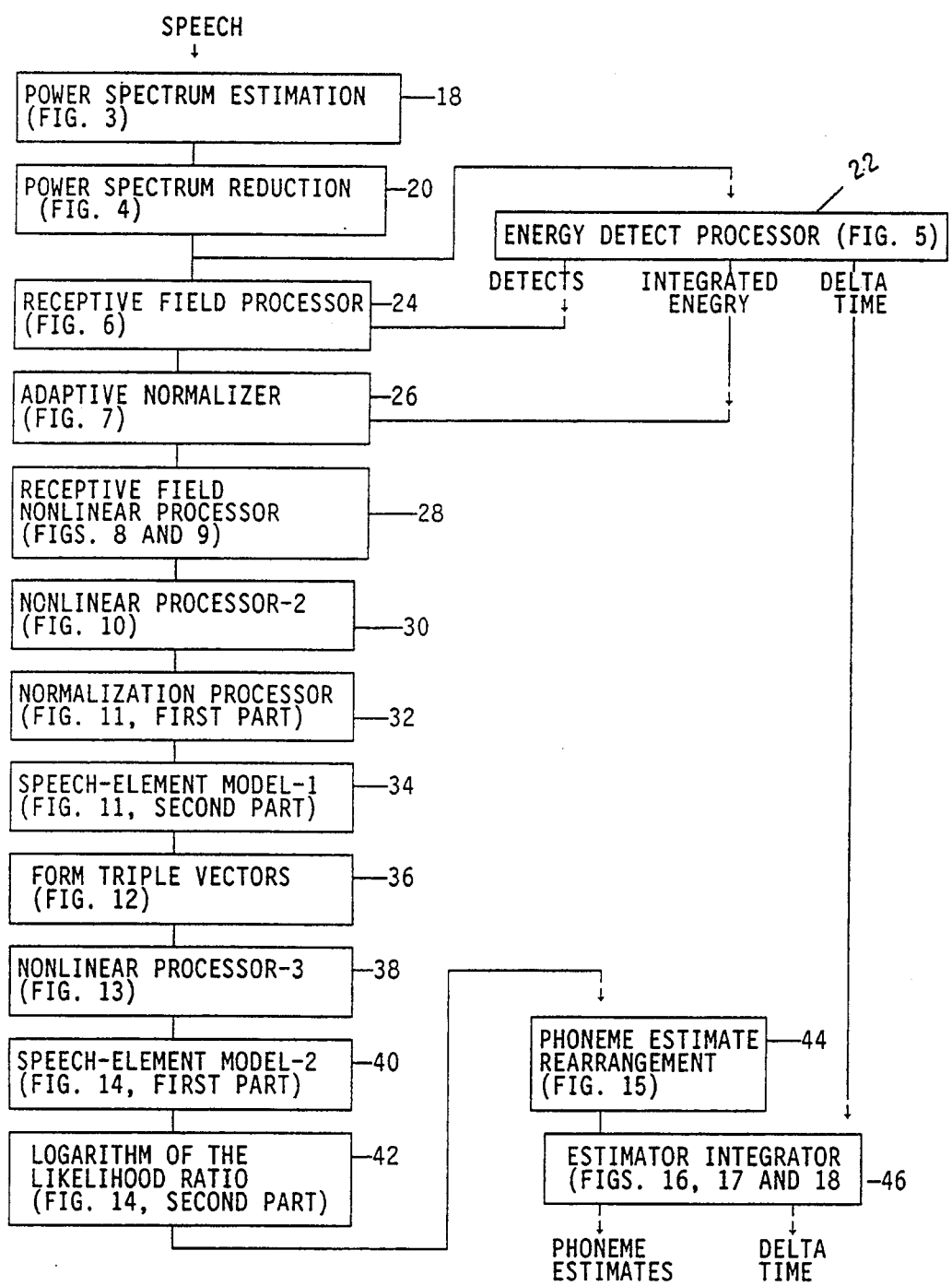
FIG. 2 is a block diagram depicting a phoneme estimator shown in FIG. 1.

FIG. 2 is an overview of the phoneme estimator 12 shown in FIG. 1. It should be noted at this point that the drawings represent the various processes as being performed by separate processors, or blocks, as they could be in an appropriate hard-wired system. This segregation into separate processors facilitates the description, but those skilled in the art will recognize that most of these functions will typically be performed by a relatively small number of common hardware elements. Specifically, most of the steps would ordinarily be carried out by one or a very small number of microprocessors.

Referring again to FIG. 2 the phoneme estimator 12 receives a raw SPEECH signal and processes it, reducing the data through power spectrum estimation in block 18 and power spectrum reduction in block 20 as described in more detail below with reference to FIGS. 3-4. The data-reduced signal is applied to both an energy detect processor 22 and a receptive field processor 24.

If the energy in the data-reduced signal is above a predetermined threshold, indicating the presence of speech, the energy detect processor 22 asserts a DETECT signal on line 22A. The asserted DETECT signal energizes the receptive field processor 24, which then further processes the data, assembling a receptive field. If the signal energy is below the threshold, the DETECT signal is not asserted and the receptive field processor 24 is not energized, prohibiting further processing of the SPEECH signal. The energy detect processor 22 and the receptive field processor 24 are described in more detail below with reference to FIGS. 5-6.

Detecting the presence of phonemes in the received speech using the energy processor 22 replaces the two-path processing performed by the speech-recognition system described in copending application entitled "Speech-Recognition Circuitry Employing Phoneme Estimation" of which this is an improvement. The earlier system, which is hereinafter referred to as speech-recognition system-I, examines the speech signal and detects the presence of either initial consonants or vowels in one processing path, and the presence of final consonants in the other processing path. Depending on which path produces the detect signal, the speech signal is further processed by a vowel, initial consonant, or final consonant processor. Thus the speech-recognition system-I requires three receptive field processors, each processing the speech signal to match it to a subset of phonemes, instead of the one used in the present system. The present system, through enhanced modeling and data reduction, is able to compare the signal representation with the full set of possible phonemes.

Referring again to FIG. 2, when a DETECT signal is asserted on line 22A, the energy detect processor 22 also produces on line 22B, a signal proportional to the integrated energy of the speech signal as described in more detail below with reference to FIG. 5.

The integrated energy signal is applied to an adaptive normalizer 26 which also receives the output of the receptive field processor 24. The integrated energy signal is used by the adaptive normalizer 26 to impose a second, higher energy threshold.

The adaptive normalizer 26 removes an estimated mean from the data, that is, from the output of the receptive field processor 24. The estimated mean is incrementally updated only if the integrated energy level of the data is above the higher predetermined energy threshold, signifying a speech signal with a relatively large signal-to-noise ratio. Thus the adaptive normalizer 26 does not update the estimated mean if the integrated energy level of the data is below the threshold since the estimates may not be accurate in such cases. The effect of the operations of the adaptive normalizer 26 on data with a high integrated energy signal is to apply to the data an adapted mean which decays exponentially over a long "time constant".

The time constant is different for different situations. Specifically, the time constant in this case is measured, not in time itself, but in the number of instances input vectors are applied to the adaptive normalizer. A large number signifies that a particular speaker is continuing to speak. Thus, the characteristics of the speech and the associated audio channel should not change drastically for this speech. Accordingly, a long time constant may be used and the mean of the data associated with this speech can be reduced to near zero.

Conversely, a small number of instances in which the input vectors are applied to the adaptive normalizer indicates that a new speaker may be starting to speak. Thus, the characteristics of the speech and/or the audio channel are not yet known. Accordingly, a relatively short time constant is used, and the adaptive average is quickly adjusted to reduce the mean of the data as close to zero as possible. The adaptive average is adjusted to accommodate the new speakers pronunciation of the various sounds, for example, and also to accommodate the differences in the sounds due to the quality of the audio channel. The operation of the adaptive normalizer is discussed in more detail below with reference to FIG. 7.

The normalized data are next applied to a receptive field nonlinear processor 28 and thereafter to another nonlinear processor-2 30. The nonlinear processors 28 and 30, described in more detail below with reference to FIGS. 8-9 and 10, respectively, manipulate the data, and each passes linear first order data terms and nonlinear second, third and/or fourth order terms. These terms are then passed to normalization processor 32. The normalization processor 32 normalizes the data and applies them to a first of two speech-element models. The normalization processor 32 is described in more detail below with reference to FIG. 10.

The speech-element model-1 processor 34 reduces the data applied to it using parameters, that is, selected speech labels, formulated from the development data. The speech-element model-1 processor 34 thus selects for further processing only the most significant data. The reduced data, which represent figures of merit related to the likelihood that the speech contains respective speech elements associated with the components, are then concatenated into triple vectors in block 36. Each input vector applied to processor 36 induces an output, which is formed, usually, from the input vector, the previous input vector and the subsequent input vector. The output may in the alternative be formed with zero-filler vectors, the choice depending upon the delta time signal 22C from the energy detect processor 22. The use of the subsequent input vector induces a delay in processor 36 which is described in more detail below with reference to FIG. 12.

The triple vectors are then applied to a third nonlinear processor-3 38. The nonlinear processor-3 38 manipulates the data by computation-intensive, nonlinear operations and then applies the data to a second speech-element model-2 processor 40 which produces estimates that the speech contains the speech elements (which we later refer to as phoneme isotypes) listed in Table 8 (FIG. 43). The speech-element model processors 34 and 40 are described in more detail below with reference to FIGS. 11 and 14, respectively. The nonlinear processor-3 38 is described in more detail below with reference to FIG. 13.

Thereafter, the estimates are applied to a logarithm processor 42 which calculates the logarithm of the likelihood ratio for each. The estimates are then further simplified, that is, re-arranged and integrated, in processors 44 and 46 to ready the data for the word/phrase determiner 14 (FIG. 1). The simplified estimates and the delta time signal 22C from the energy detect processor 22 (FIG. 2) are then applied to the word/phrase determiner 14 which assigns words or phrases to the speech. The various processors 42, 44 and 46 are described in more detail below with reference to FIGS. 14–18.

PHONEME PROCESSING

Figure 3:
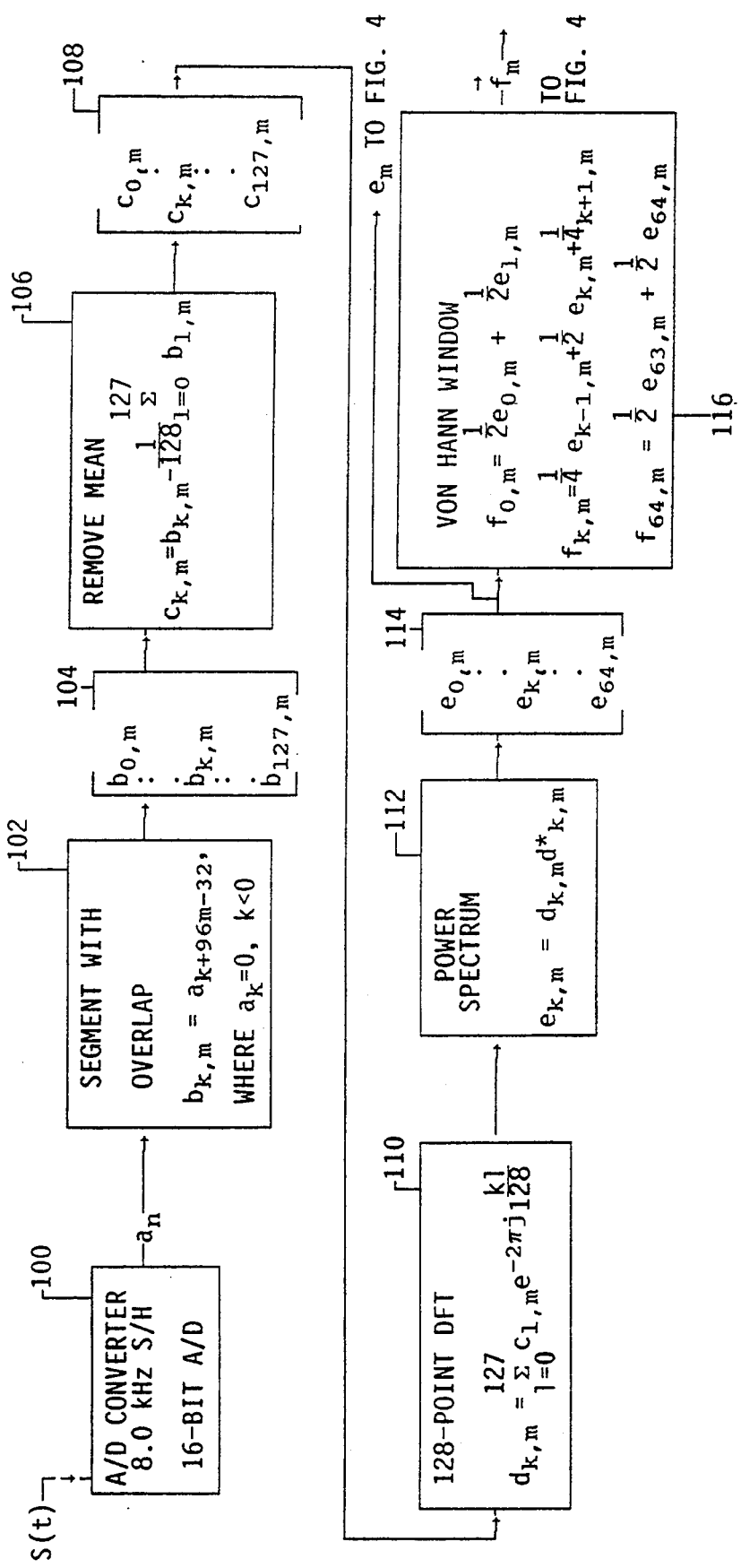
FIG. 3 is a block diagram depicting calculation of an estimation of the signal power spectrum, shown as block 18 in FIG. 2.

Referring now to FIG. 3, the power spectrum estimation processor 18 calculates a power spectrum estimate of the SPEECH signal by first converting the analog SPEECH signal to a digital representation in an Analog-to-Digital (A/D) converter 100. The A/D converter, which is of conventional design, samples the SPEECH signal at a rate of 8-kHz and produces 16-bit digital data symbols, $a_n$, representing the amplitude of the signal. The 8 kHz sampling rate is consistent with the current telephone industry standards.

The digital data samples, $a_n$, are then segmented into sequences of 128 data samples as illustrated in block 102. Each of these sequences corresponds to a 12-millisecond segment of the SPEECH signal. The sequences can be thought of as vectors $b_m$ 104, with each vector having elements $b_{k,m}$. The $b_m$ vectors overlap by 32 data samples, and thus each $b_m$ vector contains 96 new elements and 32 elements from the previous vector. Next the mean, or D.C., value of the signal segment represented by the $b_m$ vector is removed in block 106, producing a vector $c_m$ 108. The mean value conveys information which is of little or no value in phoneme estimation.

Referring again to FIG. 3, the vector $c_m$ 108 is applied to a 128-point discrete Fourier Transform (DFT) circuit 110. Up to this point, the power spectrum estimation process is similar to the speech-element preprocessor of the speech-recognition system-I. However, in order to increase the resolution of the results of the DFT, the current system performs the DFT using 128 data elements as opposed to the system-I, which uses 64 data elements and 64 ZEROS.

The 128 distinct elements applied to the DFT circuit are real and thus only sixty-five of the 128, mostly complex, output values of the DFT, $d_{k,m}$, represent non-redundant data. The power spectrum is thus calculated by multiplying the DFT values $d_{k,m}$ by their respective complex conjugates $d^*_{k,m}$ to produce corresponding real values, $e_{k,m}$. The sixty-five nonredundant values are retained in a vector $e_m$ 114. The data are thus reduced by one-half while the information believed to be the most important to phoneme estimation is retained.

Figure 4:
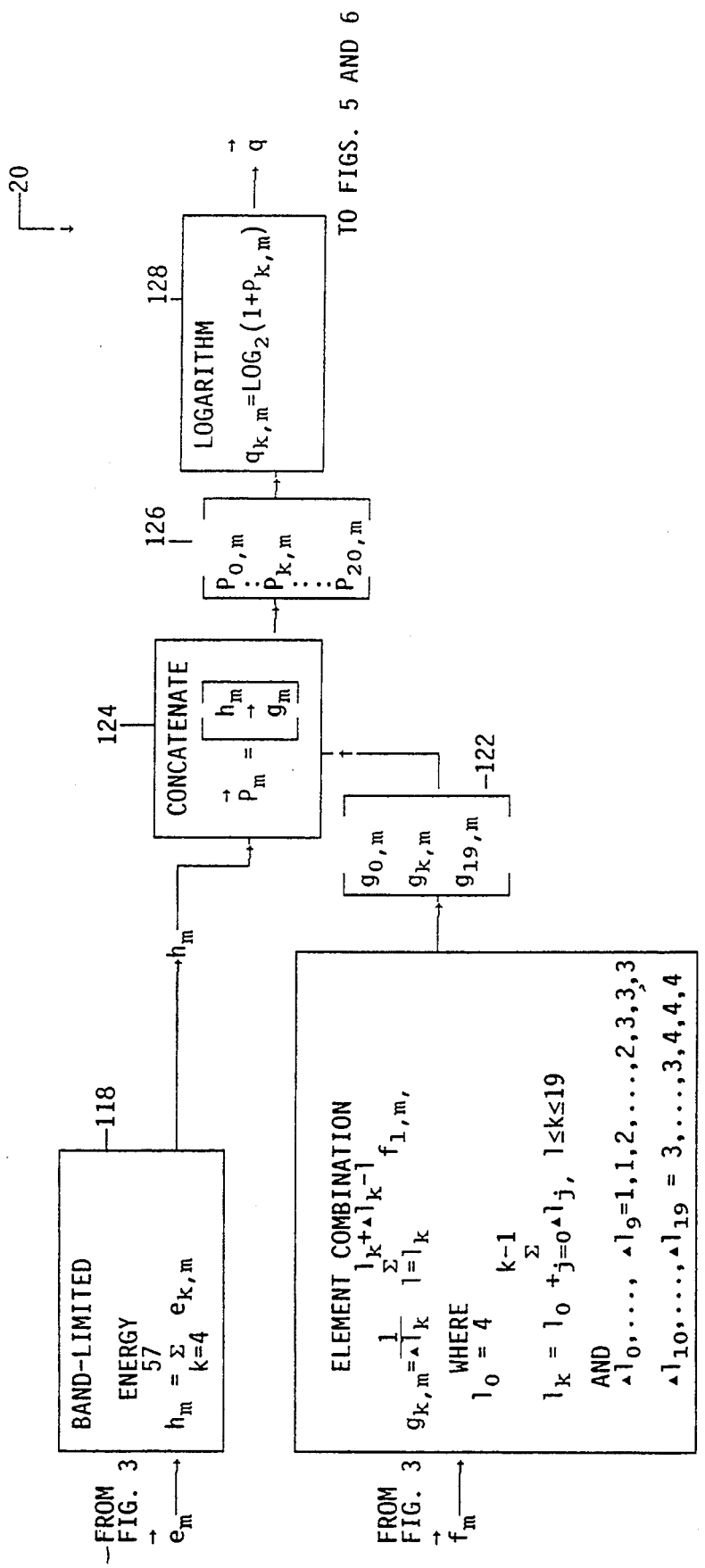
FIG. 4 is a block diagram depicting calculation of a reduction of the power spectrum estimation, shown as block 20 in FIG. 2.

The power spectrum values $e_{k,m}$ are applied simultaneously to a "von Hann window" circuit 116 and a band-limited energy circuit 118 (FIG. 4). The von Hann window circuit "smooths" the spectrum in a conventional manner, reducing the sidelobes that result from truncation in the time domain.

The smoothed vector $f_m$ is applied to block 120 where various elements, $f_{k,m}$, of vector $f_m$ are combined, producing a strategically reduced vector $g_m$ 122. The reduced vector includes terms from a frequency range of 218.75 Hz–3593.75 Hz. This range corresponds to signals received using telephone line communication.

The band-limited energy $h_m$ from circuit 118 includes the energy within the same frequency range as that used for the vector $g_m$ 122. The previous speech-recognition system-I used an energy term that was not band-limited in this fashion, but instead was the average power of the entire spectrum. Using the average power introduced some noise into the energy which was not derived from the speech itself.

The band-limited energy value, $h_m$, is concatenated with the vector $g_m$ 122 in circuit 124 to form a vector $p_m$ 126. Thus vector $p_m$ contains a data-reduced version of frequency and energy information representing, for the most part, the center band frequencies of the SPEECH signal. Reducing the data in this way retains information of particular value for further computations while reducing the data to a manageable size.

The phoneme-identification information probably resides in the relative, rather than in the absolute, sizes of variations of the individual elements $p_{k,m}$ of vector $p_m$ 126. Accordingly, as in the speech recognition system-I, the elements $p_{k,m}$, which are all positive or zero, are incremented by one, and the logarithms of the results are computed as indicated in block 128. Incrementing the vector $p_m$ elements by one ensures that the resulting logarithm values are zero or positive ($\log_2 1 = 0$). The resulting values $q_{k,m}$ are then applied to energy detect processor 22 and receptive field processor 24 (FIG. 6).

Figure 5:
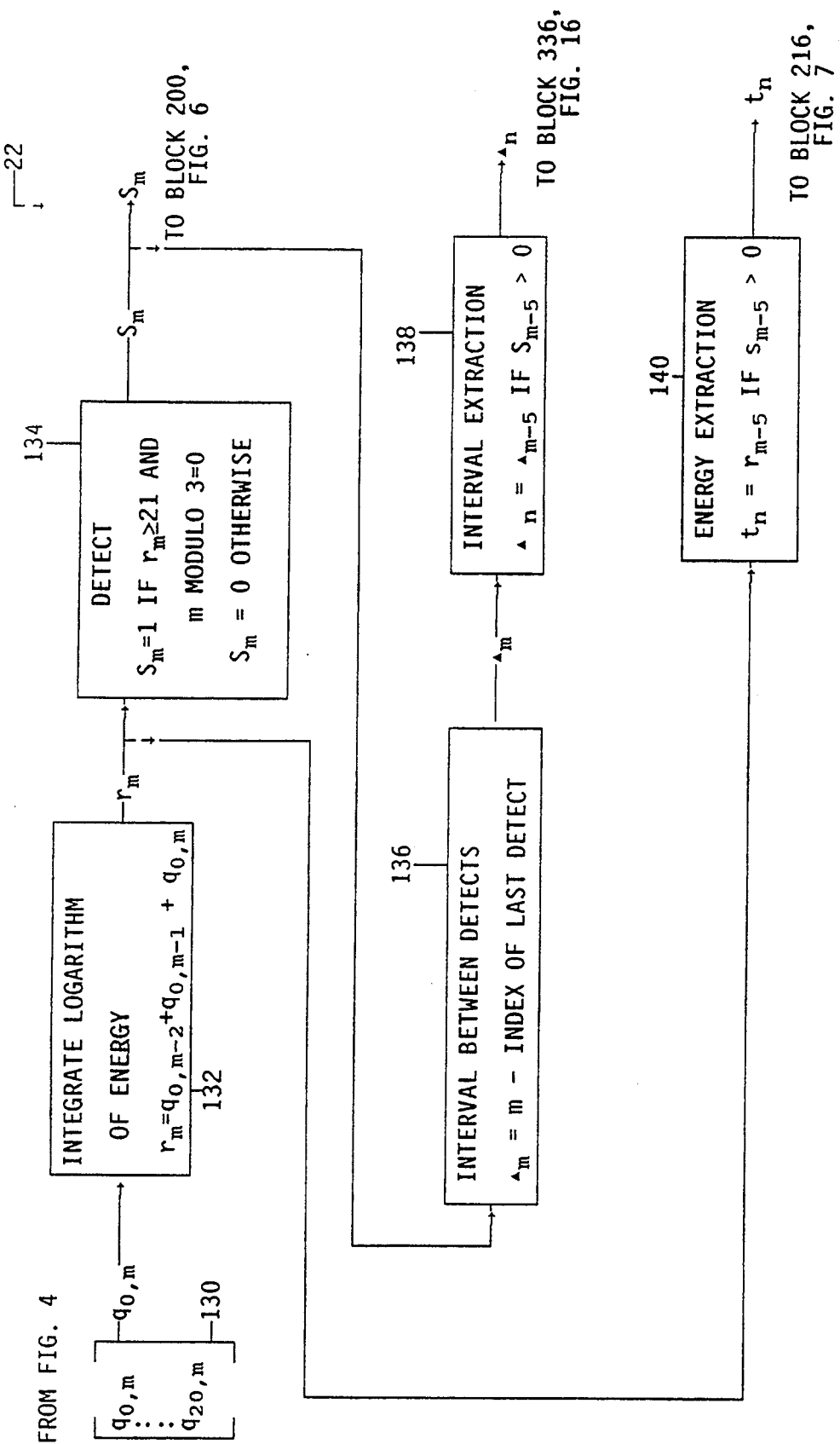
FIG. 5 is a block diagram of an energy detect processor, shown as block 22 in FIG. 2.

FIG. 5 depicts the energy detect processor 22 in block diagram form. The energy component of vector $q_m$ 130, element $q_{0,m}$, is integrated over a three time unit time segment, in integrating circuit 132. Each time unit is 12 milliseconds long, as discussed above, and thus the energy is integrated over 36 milliseconds. If the integrated energy, $r_m$, exceeds a predetermined threshold a detector 134 asserts a DETECT signal 22A, $s_m$, indicating the presence of speech. The DETECT signal, $s_m$, may be asserted at most once every three time units, as shown in block 134, since the subscript, m, of the energy parameter $r_m$ must be zero in modulo three arithmetic.

Each time the DETECT signal 22A is asserted, block 136 produces a delta time signal ($\blacktriangle_m$) corresponding to the time between this DETECT signal and the previous one. The delta time signal is applied to an interval extraction circuit 138, which produces a time signal $\blacktriangle_n$ 22C. An associated energy extraction circuit 140 produces an integrated energy signal, $t_n$ 22B. Both the $\blacktriangle_n$ and the $t_n$ signals correspond to the SPEECH signal five time units earlier, as discussed below with reference to FIG. 6. The parameter index has changed from "m" to "n" to emphasize that the extracted delta time and integrated energy signals are produced for only certain segments of the SPEECH signal, that is, segments for which a DETECT signal is asserted.

Figure 6:
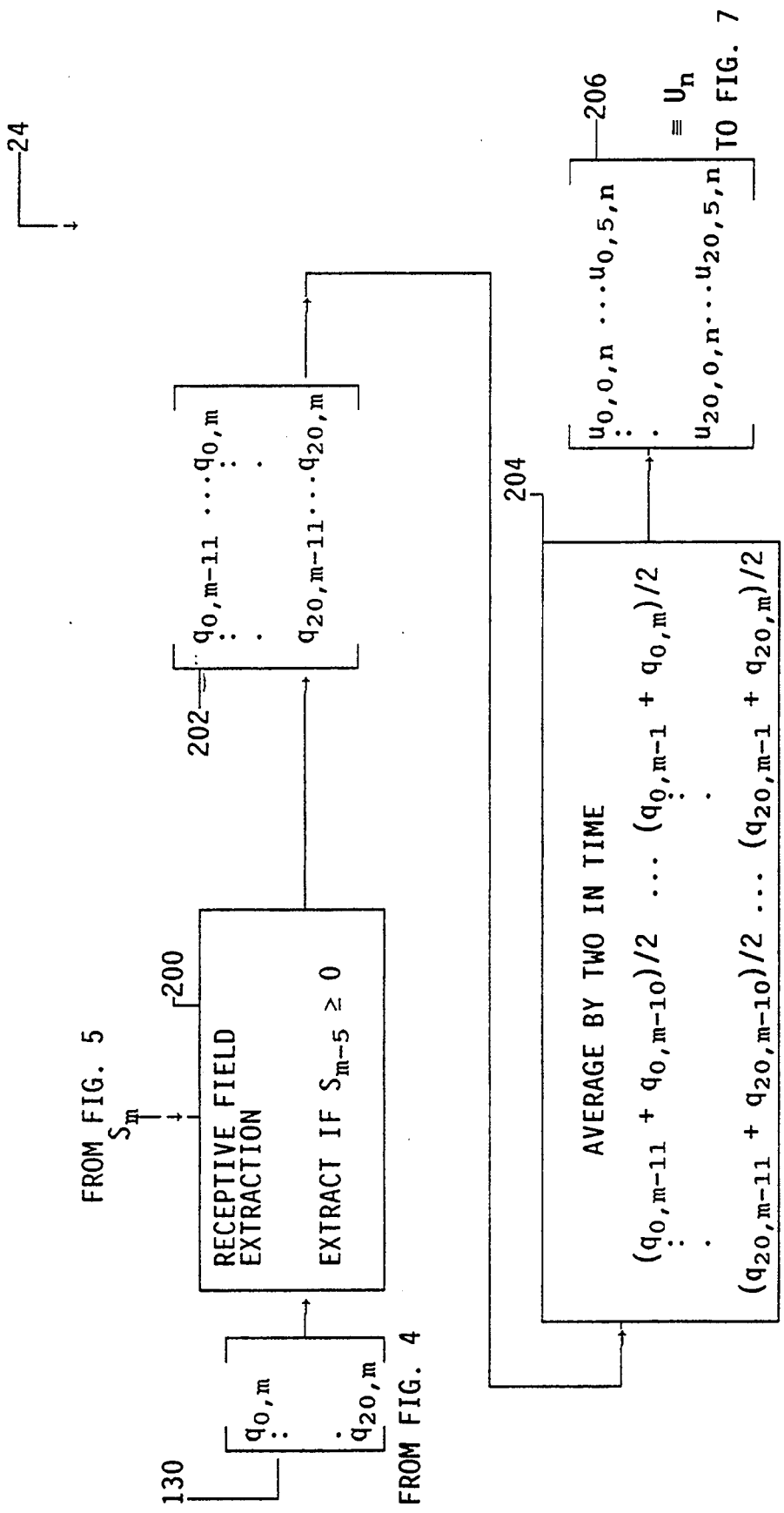
FIG. 6 is a block diagram depicting a receptive field processor, shown as block 24 in FIG. 2.
Figure 12:
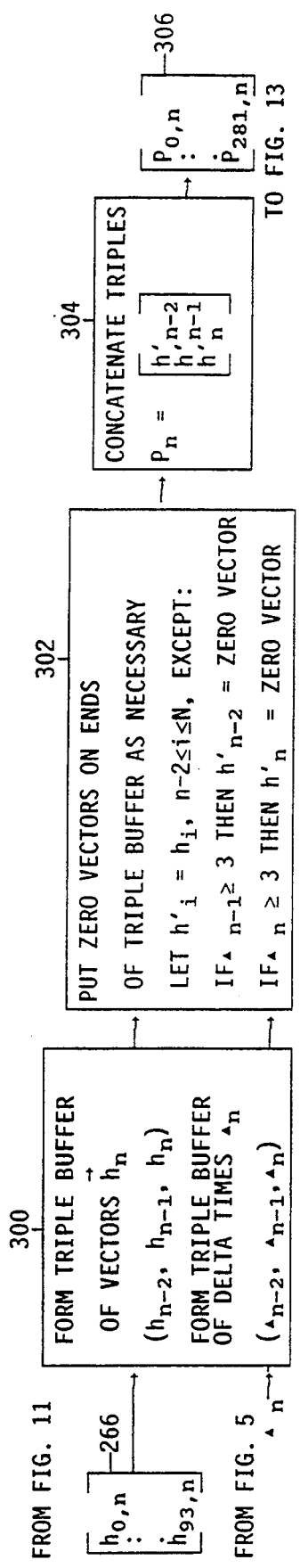
FIG. 12 is a block diagram illustrating a concatenation of vectors into triples, shown as block 36 in FIG. 2.

The DETECT signal 22A is applied, along with the vector $q_m$ 130, to the receptive field processor 24 shown in FIG. 6. The integrated energy signal 22B is applied to the adaptive normalizer 26 shown in FIG. 7. The delta time signal 22C is applied both to the formation of triple vectors in processor 36 as shown in FIG. 12, and to the estimator integrator 46 as discussed below with reference to FIGS. 16 and 17.

Referring now to FIG. 6, the DETECT signal 22A energizes a receptive field extraction circuit 200 which assembles a receptive field 202, that is, a group of $q_m$ vectors containing frequency information covering a signal segment 12 time units long. The DETECT signal corresponds to a signal segment in the middle of the receptive field, that is, to a signal segment 5 time units earlier, or to the m-5 column in the receptive field matrix 202. The delay is necessary to synchronize the delta time and integrated energy signals produced by the energy detect processor 22 (FIG. 5) with the receptive field, centering as closely as possible the signal segment for which the DETECT signal is asserted. The receptive fields are relatively large, 12 time units, and thus no information is lost in limiting the DETECT signal to at most one every three time units.

An averaging circuit 204 averages pairs of adjacent vectors of the receptive field matrix 202, that is, elements $q_{o,m-11}$ and $q_{o,m-10}$ are averaged, elements $q_{o,m-9}$ and $q_{o,m-8}$ are averaged, etc. This operation reduces data by one-half, producing matrix $U_n$ 206. The parameter index is again changed from "m" to "n" to emphasize that receptive fields and integrated energy signals are produced for only certain segments of the SPEECH signal.

The speech-recognition system-I discussed above reduces the data by two-thirds by averaging the data over three time units. The reduced data are thereafter subjected to nonlinear processing. Using the current system, however, better resolution is achieved by averaging the matrix elements over only two time units and retaining more data. The "extra" data may be retained at this point in the process because of enhanced data reduction within the receptive field nonlinear processor 28, discussed below in connection with FIGS. 8 and 9.

Figure 7:
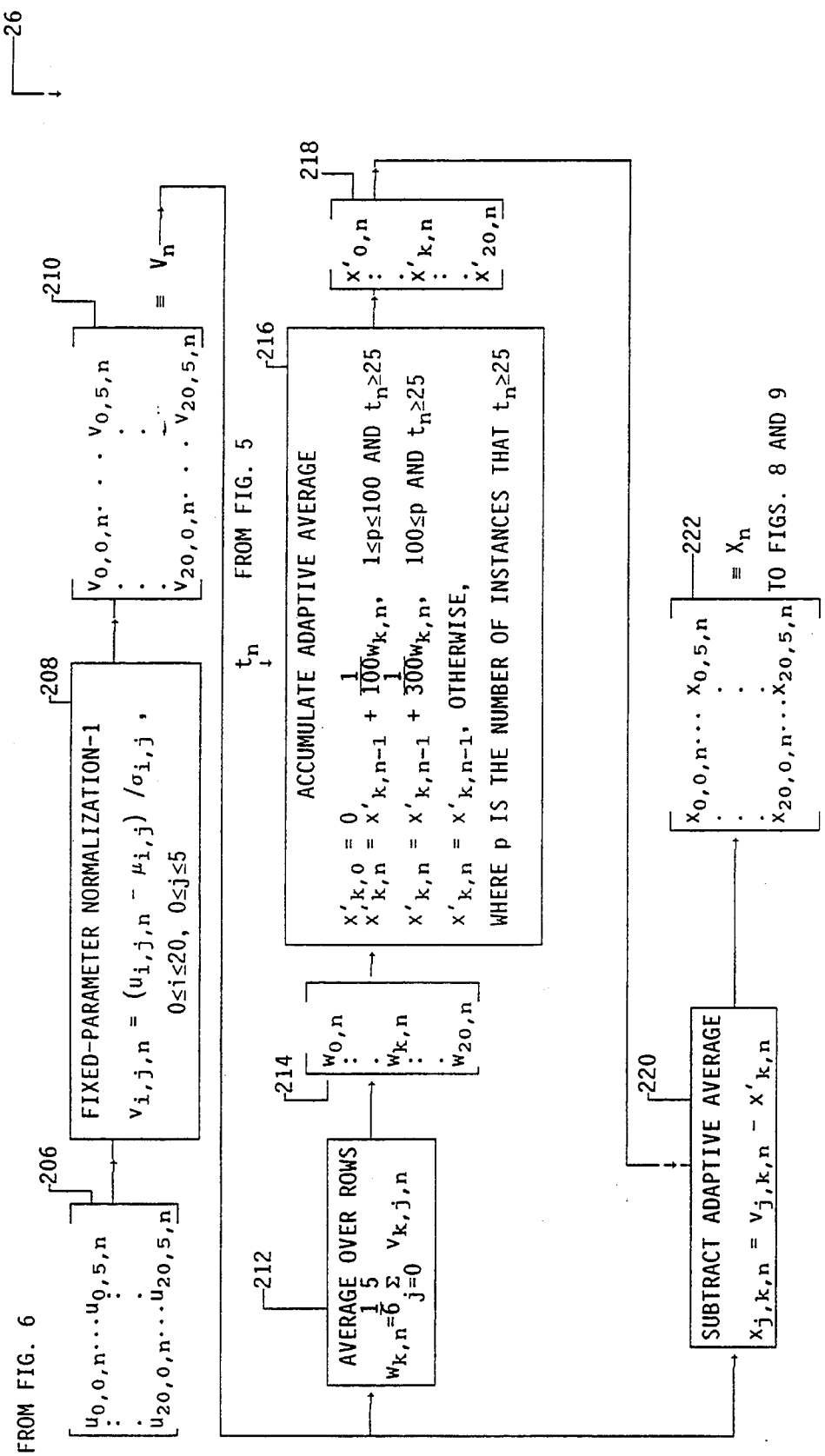
FIG. 7 is a block diagram depicting an adaptive normalizer, shown as block 26 in FIG. 2.

The matrix $U_n$ 206, is next applied to the adaptive normalizer 26 shown in FIG. 7. The adaptive normalizer 26 produces a matrix $V_n$ 210 by subtracting a fixed-parameter mean $\mu_{ij}$ and then dividing by a fixed-parameter standard deviation, $\sigma_{ij}$. The fixed-parameter mean and standard deviation values are calculated from the development database as described below with reference to FIG. 19.

If the statistics of the incoming SPEECH signal are sufficiently close to those of data in the development database then the "normalized" matrix $V_n$ 210 has a mean close to zero and a standard deviation close to one. However, it is likely that the statistics of the incoming SPEECH signal are somewhat different from those of data in the development database. Indeed, individual voice samples from the development database may have statistics that are different from those in the aggregate. Hence, for an individual SPEECH signal, we expect that matrix $V_n$ will have a mean different from zero and a standard deviation different from one. Accordingly, further adaptive normalization is applied in the circuitry of FIG. 7 in order to allow at least the mean to decay toward zero.

If the matrix $V_n$ 210 data correspond to a SPEECH signal segment for which the integrated energy, $t_n$ 22B (FIG. 5), is above a predetermined value, indicating a high signal-to-noise ratio and thus voicing, the data are further processed by calculating their adaptive average in blocks 212-218 and then subtracting the average in block 220. First, the data are averaged over time, that is, over the matrix rows, in averaging circuit 212 producing vector $w_n$ 214. Vector $w_n$ thus contains only the signal frequency information. This information adequately characterizes the speaker's voice and the audio channel. These characteristics should not vary significantly over time, particularly over the time corresponding to the matrix data. Averaging the data over time thus reduces them from 105 parameters, that is, 105 elements of matrix $V_n$, to twenty-one parameters, that is, twenty-one elements of vector $w_n$.

The elements of vector $w_n$ 214 are applied to exponential averaging circuit 216. Adaptive averaging circuit 216 thus compares the integrated energy, $t_n$ 22B, calculated in energy detect processor 22 (FIG. 5) with a predetermined threshold value which is higher than the detect threshold used in the energy detect processor 22. Thus averaging circuit 216 detects which signal segments have high signal-to-noise ratios, that is, which segments have significant voice components.

If the integrated energy does not exceed the "voice" threshold-value, the adaptive average vector $x'_n$ 218 remains what it was at the previous instance, $x'_{n-1}$. In this case the exponential average is subtracted in block 220 as before, however, the average itself is not changed. Signal segments with energy values below the voice-threshold may correspond, on the one hand, to unvoiced fricative or nasal phonemes, but may also correspond, on the other hand, to breathing by the speaker or other quiet noises, particularly at the end of breath groups. Such low-energy signal segments may not be reliable in characterizing the mean of vector $w_n$ 214 for purposes of recognizing phonemes.

The exponential averaging is performed using a time period which is relatively long with respect an individual phoneme but short when compared with a series of words or phrases. The averaging thus does not greatly affect the data relating to a single phoneme but it does reduce to near zero the mean of the data relating to words or phrases.

The time period used varies depending on the length of time the system has been processing the speech. Specifically, exponential averaging is performed over either a short time period corresponding to, for example, 100 receptive fields with sufficient energy—approximately 3.6 seconds—or a longer time period corresponding to, for example, 300 receptive fields with sufficient energy—approximately 10 seconds—the length of time depends on the number of times the integrated energy signal 22B has exceeded the voice-threshold, that is, the number of times that $t_n \geq 25$. The shorter time period is used when the system encounters a new speaker. It thereby adapts quickly to the speaker's characteristics and the characteristics of the audio channel. Thereafter, the system uses the longer time period to process the speaker's speech because his or her voice characteristics and those of the audio channel are assumed to remain relatively constant.

Once the calculations for the adaptive average vector $x'_n$ 218 are completed, the adaptive average vector is subtracted from the matrix $V_n$ 210 elements in block 220 to produce matrix $X_n$ 222. The mean of the data in matrix $X_n$, corresponding to a long time period and representing speech signals that include voicing, is now close to zero. Matrix $X_n$ is next applied to receptive field nonlinear processor 28 shown in block diagram form in FIGS. 8 and 9.

Figure 8:
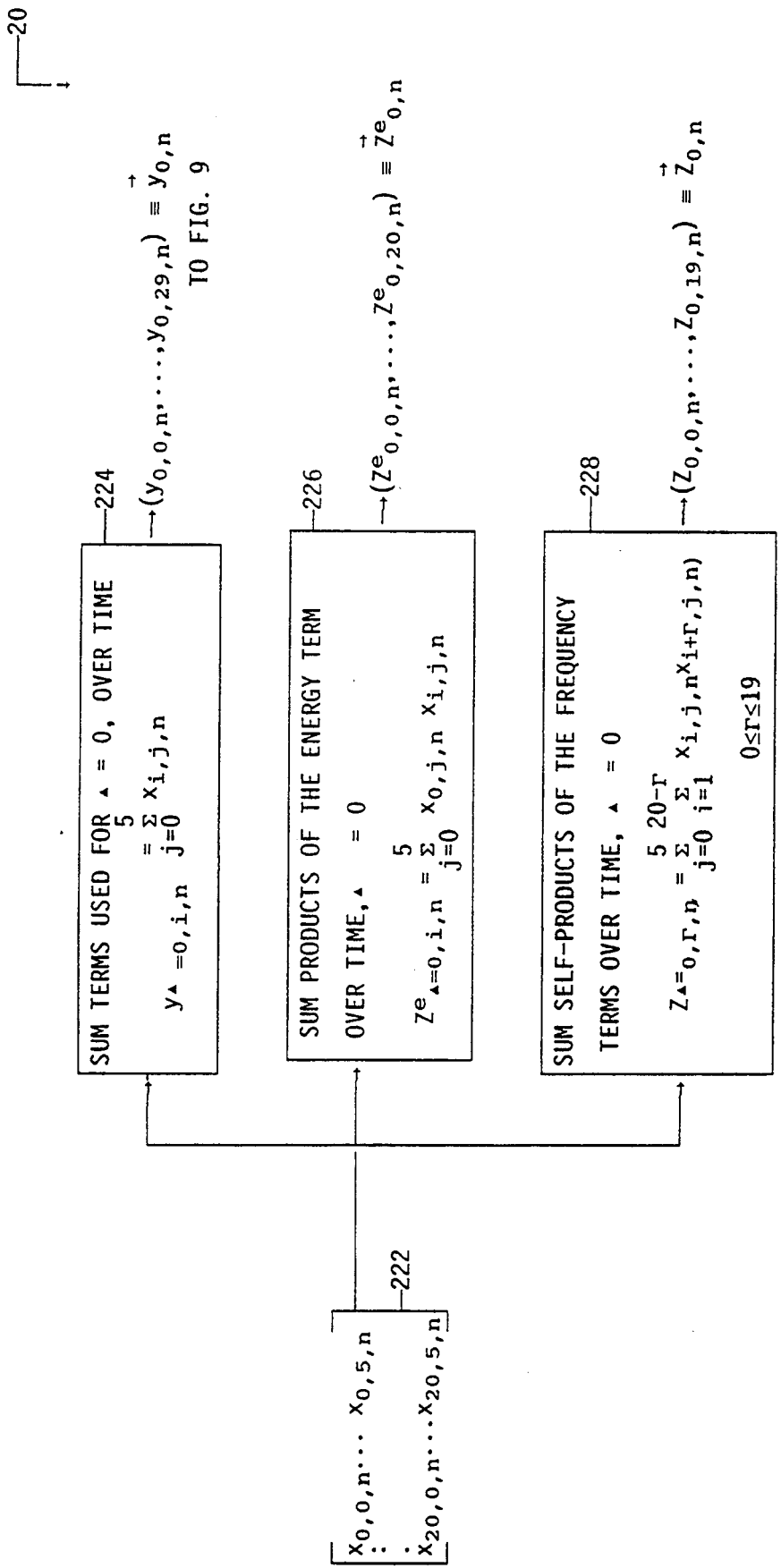
FIGS. 8 and 9 taken together illustrate a receptive field nonlinear processor, shown as block 28 in FIG. 2.
Figure 9:
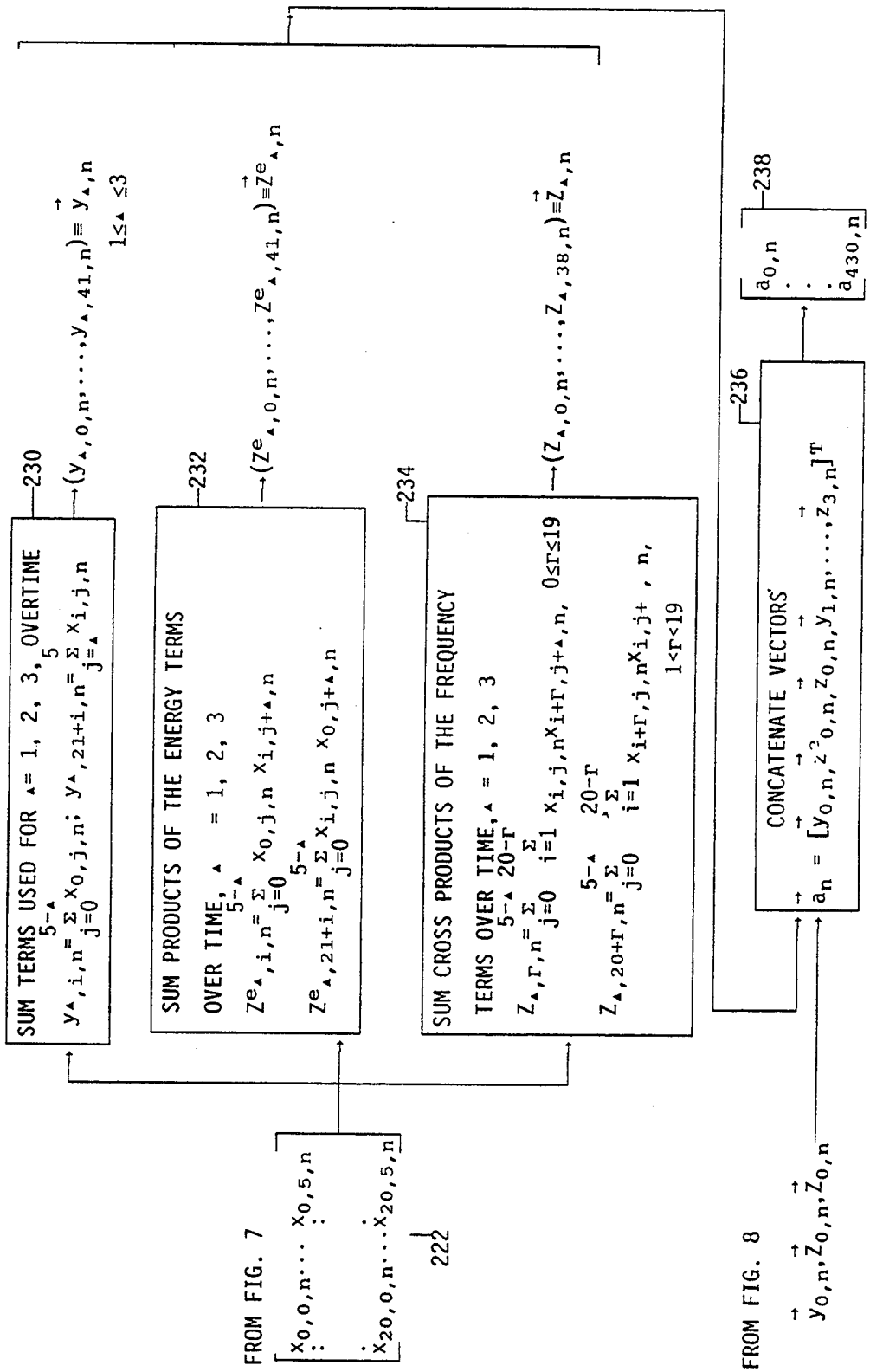

In comparison with the corresponding nonlinear processing described in our previous application, the nonlinear processing of FIGS. 8 and 9 calculates fewer nonlinear elements. As a consequence, we have been able to retain more data in earlier processing and thus supply higher-resolution data to the calculation of the more-important nonlinear products that we do calculate.

With reference to FIGS. 8 and 9, the elements of matrix $X_n$ 222 are combined as linear terms and also as specific, partial outer products in blocks 224–234. Essentially, the linear terms and the partial outer products are added over the time dimension of the receptive field. These specific products are designed to convey certain information about the speech signal while significantly reducing the data from what they would be if a straight outer product, that is, all products of distinct matrix-element pairs were calculated. The earlier speech-recognition system-I calculates a straight outer product at this point in the processing, and thus, data are required to be significantly reduced during prior processing. The current system, on the other hand, may retain more data up to this point due to this nonlinear processing step, and it thus maintains better resolution of the incoming data.

The receptive-field nonlinear processor 28 produces four vector groups. Each vector group contains vectors $Y_{\blacktriangle,n}$, $Z^e_{\blacktriangle,n}$, and $z_{10,n}$ and is associated with a different time delay. The $Y_{\blacktriangle,n}$ vectors contain data which are a linear combination of the terms used in forming the two associated "z" vectors. The $z^e_{\blacktriangle,n}$ vectors contain the results of combining certain partial outer products formed using the energy, or first, terms in the various matrix $X_n$ 222 columns, and the $z_{\blacktriangle,n}$ vectors contain the results of specific partial outer products formed using the non-energy, or frequency, terms of the matrix $X_n$ columns. The formation of each of these vectors is discussed below.

Significant time averaging is performed in receptive-field nonlinear processor 28. It is assumed that a phoneme is "stationary" within a receptive field and thus that the location of a given frequency column within the receptive field does not convey much useful signal information. However, the nonlinear combinations of frequency columns, averaged over the time window of the receptive field, do represent information which is useful for speech recognition.

As set forth above, a vector group is formed for each of four time-difference segments. Vector groups for further time differences are not calculated because information relating to variances over greater time differences appears of little value.

Specifically, the vector group for a time difference of zero ($\blacktriangle = 0$) is formed in blocks 224–228 of FIG. 8. Block 224 produces the first element of the vector $Y_{0,n}$ by adding together the first elements in all of the columns of the matrix $X_n$ 222. It produces the second vector element by adding together the second elements in all the columns, and so on. Accordingly, the vector $Y_{0n}$ has as its elements the matrix data summed over time.

The second vector in the vector group, vector $z^e_{0,n}$ is formed using the matrix energy terms, which are the first elements of the columns. Block 226 forms, for each column, the product of the energy term and all the other elements in the same column. The products are then summed to form the elements of vector $z^e_{0,n}$. The vector elements are thus the energy products summed over time.

The third vector in the vector group for the time difference of zero, $z_{0,n}$, is formulated in block 228. This block forms all the products among the matrix $X_n$ 222 frequency elements, that is, among all the elements in a column except the first. One could here use the outer product, taking all of these products separately. Instead, a sum is formed of these products which is like that in an autocorrelation. This sum is called a "self-product" in block 228 since it is formed from within the frequency elements of a single column. This self-product is then summed through time, i.e., over all the columns. Taking the self-products within the frequency columns instead of the full outer product strategically reduces the output vector from what it would have been if a full outer product were calculated. Thus the nonlinear processor can process a larger input vector containing more signal frequency data, that is, data with higher frequency resolution.

Vector groups for time differences of 1, 2, and 3 are calculated in blocks 230–234 shown in FIG. 9. The vector $Y_{\blacktriangle,n}$ contains linear combinations of all the elements used in formulating the two associated "z" vectors. Thus for a time difference of 1 ($\blacktriangle = 1$), vector $Y_{1,n}$ contains combinations of all the elements that are one column apart, i.e., the elements in adjacent columns. Similarly, the $Y_{\blacktriangle,n}$ vectors for time differences 2 and 3 are formulated by combining all the elements that are at least two and three columns apart, respectively.

Vector $z^e_{1,n}$ is formulated in block 232 by combining the energy terms with matrix elements which are one column apart. Similarly, the vector $z_{1,n}$ is formulated in block 234 by combining frequency elements that are one column apart. Thus, the "z" vectors contain elements representing certain combinations of the energy and frequency terms from columns relating to the appropriate time difference. Similarly, the vector groups for time differences 2 and 3 ($\blacktriangle = 2, 3$) are formed by combining elements which are two and three columns apart, respectively.

Vectors $z_{\blacktriangle,n}$ are formed in block 234 by combining all the products of the frequency terms from pairs of columns. The products are summed in a fashion like that of a cross-correlation between frequency vectors. The sum in block 234 is called a "cross product" since it is formed between the frequency elements of two different columns. This cross product is then summed through time, i.e., over all the pairs of columns adhering to the time difference . Again, taking the cross product of block 234 strategically reduces the output vector from what it would have been if a full outer product were calculated. Hence, the input vector may be larger.

The vector groups are then concatenated in block 236 to form a 431-element vector $a_n$ 238, which is a nonlinear representation of the data. The superscript "T" in block 236 denotes the transpose of the vector as written.

It is important to note that, although the nonlinear processor 28 employs multiplication to produce nonlinear interactions between elements, other nonlinear functions could be used in place of multiplication; the important feature is that some type of nonlinear interaction occur. We employ multiplication merely because it is simple to implement.

Figure 10:
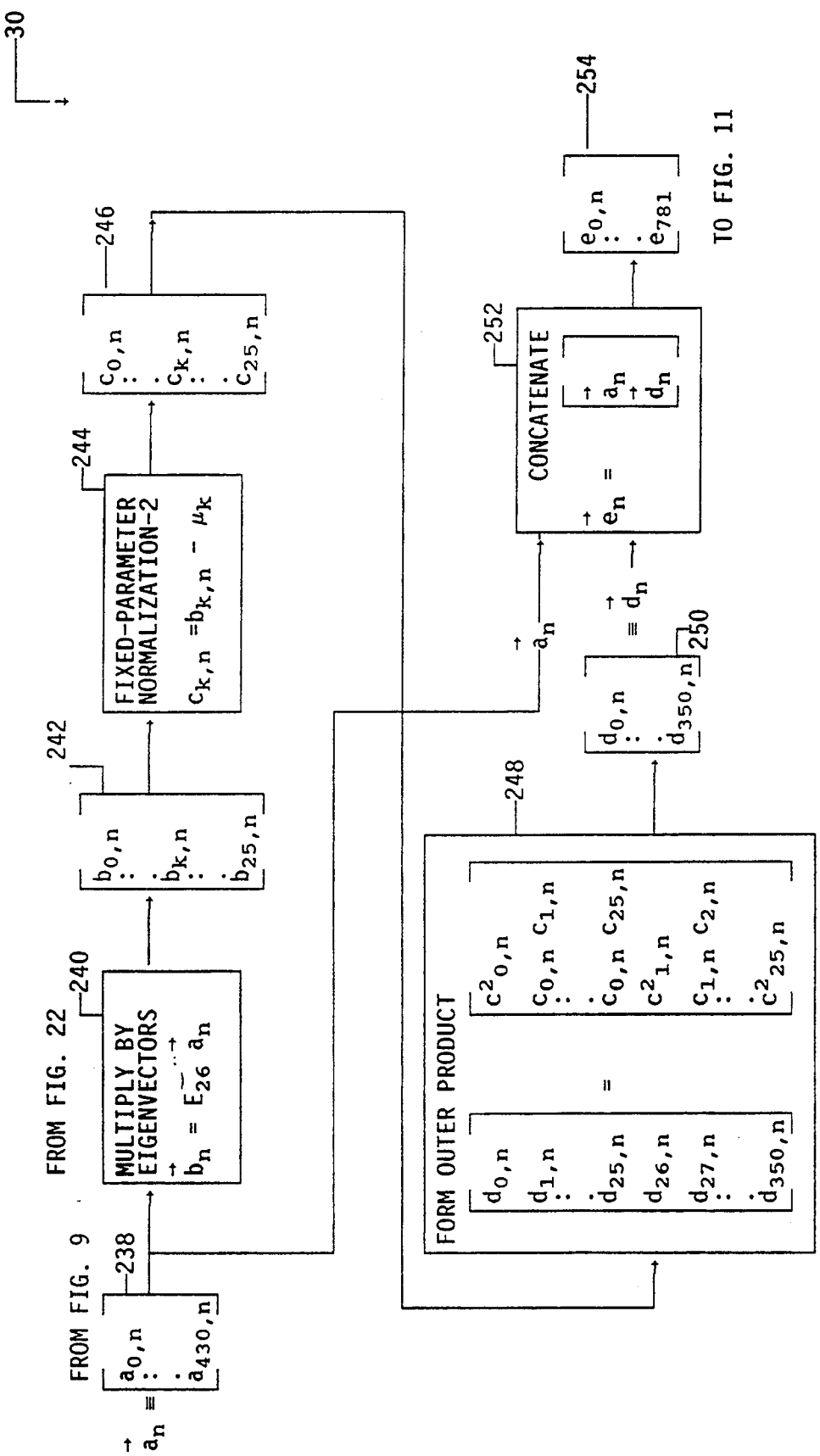
FIG. 10 is a block diagram illustrating nonlinear processor-2, shown as block 30 in FIG. 2.
Figure 22:
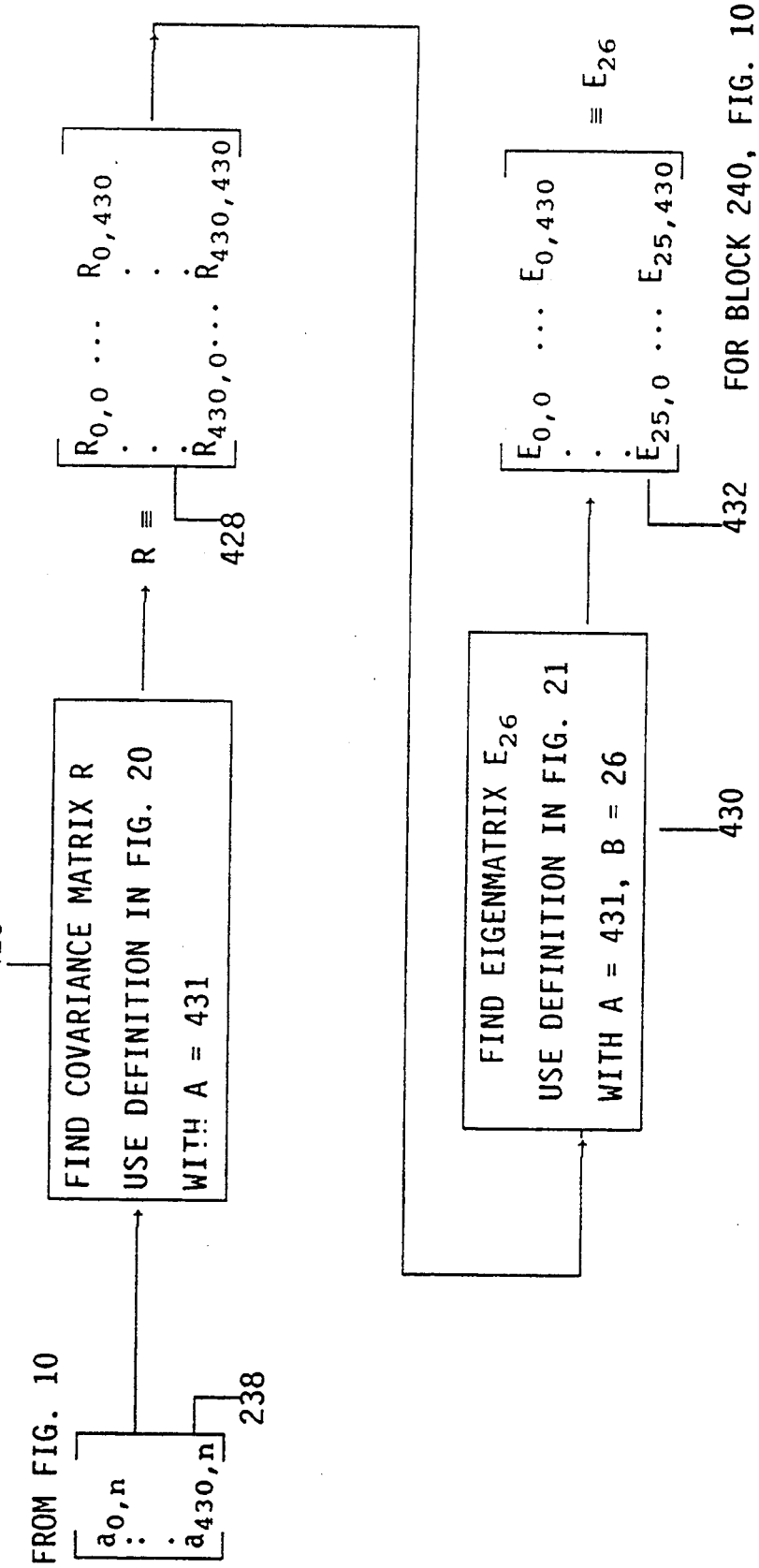
FIG. 22 illustrates the calculation of an eigenmatrix $E_{26}$, used in the nonlinear processor-2 of FIG. 10.

The vector $a_n$ 238 is applied to the second nonlinear processor-2 30 (FIG. 2) which is depicted in FIG. 10. The elements of vector $a_n$ are first decorrelated and data-reduced by multiplying them by an eigenmatrix $E_{26}$. The eigenmatrix $E_{26}$ is formulated from the development database as illustrated in FIG. 22. The eigenmatrix $E_{26}$ contains eigenvectors corresponding to the twenty-six largest eigenvalues calculated from the development data corresponding to the vector groups. Thus multiplying $a_n$ by the eigenmatrix reduces the data to the components of $a_n$ lying in the directions of the twenty-six eigenvectors selected as accounting for the most variance. The data are thus reduced from the 431 elements in vector $a_n$ to twenty-six elements in vector $b_n$ 242. By so reducing the data, we lose only about 4% of the information relating to signal variance. Accordingly, without sacrificing much of the important signal information, a compromise is achieved between (i) retaining complete signal information and (ii) limiting the number of parameters subjected to nonlinear processing and thus to a geometric expansion in the number of parameters. We believe that by selecting the information corresponding to the largest eigenvectors we are selecting the information which is most important for phoneme recognition after further processing.

The resulting twenty-six-element vector, $b_n$ 242, is subjected to fixed-parameter normalization in block 244. The mean values, $\mu_k$, depicted in block 244 are formulated from corresponding elements in a group of twenty-six-element vectors $b_n$ in the development database as discussed in more detail below with reference to FIG. 23. The twenty-six elements in the vector $b_n$ generated for the incoming SPEECH signal are compared with the average of corresponding elements in the development database. The relative data values, rather than the actual values, are important for phoneme estimation. The mean values, which may add little information, are thus eliminated from the vector elements. We may omit this normalization processing step from future embodiments.

A full outer product of the twenty-six elements of "normalized" vector $c_n$ 246 is then formulated in block 248. The result is a 351-element vector $d_n$ 250 containing third-and fourth-order terms relative to the adaptive receptive field matrix $X_n$ 222 (FIG. 7). This vector $d_n$ is concatenated with the elements of vector $a_n$ 238, forming a 782-element vector $e_n$ 254. The concatenated data are then applied to the normalization processor 32 (FIG. 11).

Again, while we employ multiplication in step 248 because that is a simple way to produce nonlinear interaction results, other nonlinear functions can also be employed for this purpose.

Figure 11:
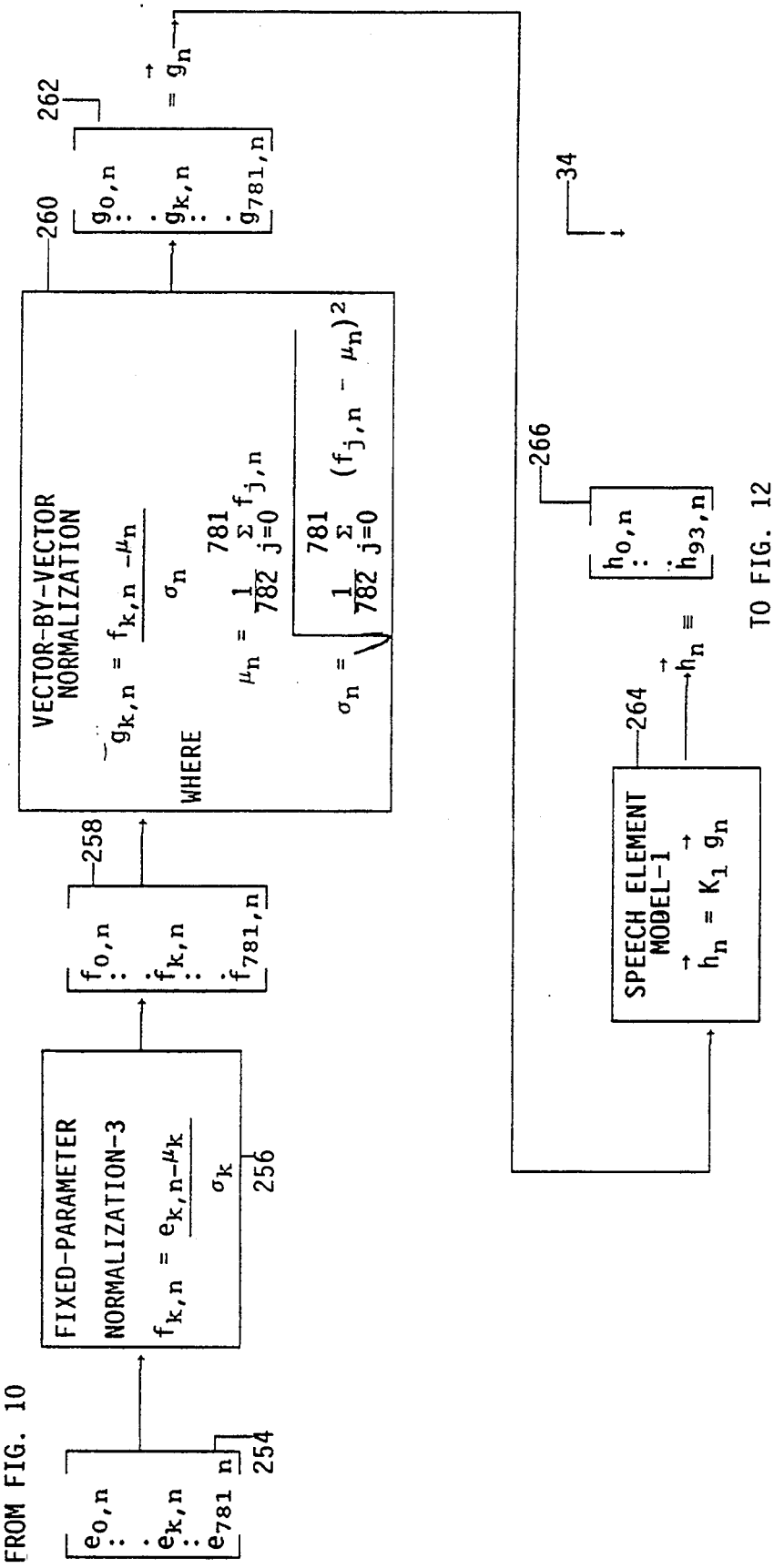
FIG. 11 is a block diagram illustrating a normalization processor and speech-element model-1 processor, shown as blocks 32 and 34 in FIG. 2.

Referring to FIG. 11, the vector $e_n$ 254 is subjected to another fixed-parameter normalization in block 256. Thereafter the data in the resultant vector $f_n$ 258 are subjected to vector-by-vector normalization. That is, each individual vector $f_n$ is normalized so that, across its 782 elements, the mean is zero and the standard deviation is one. The resulting normalized vector $g_n$ 262 is applied to the speech-element model-1 processor 264. The data are thus reduced to a set of speech element estimates, with each estimate corresponding to one of the labels in Table 7 (FIG. 43). Further nonlinear processing can be performed on the reduced data to better estimate which particular speech element the data represent.

The speech-element model-1 processor 264 multiplies the normalized vector $g_n$ 262 by a kernel $K_1$. The kernel $K_1$ contains parameters relating to specific speech element labels calculated using the data in the development database. These labels are listed in Table 7 (FIG. 42). Formulation of the kernel $K_1$ is discussed with reference to FIG. 28 below. Multiplication by the kernel $K_1$ effectively multiplies vector $g_n$ by each of ninety-four vectors, each of which is associated with a different speech element listed in Table 7. The multiplication generates a vector $h_n$ whose components are ninety-four figures of merit, each of which is related to the likelihood that the speech contains the speech element associated with it. The speech-element model-1 processor 264 thus strategically reduces the data relating to the incoming SPEECH signal, that is, vector $g_n$, from 782 elements to ninety-four elements.

The vector $h_n$ 266 containing the reduced data is then concatenated with vectors from two previous time periods in processor 36, shown in FIG. 12. The delta time signal 22C (FIG. 5) is also applied to the processor 36. Specifically both the vector $h_n$ and the delta time signal 22C are applied to buffers where the respective values for the two previous time periods of each are stored. Thus the two buffers contain information relating to the same three-time-unit-long time period.

If two consecutive vectors correspond to delta time signals longer than 12-milliseconds, we assume that the vectors are derived from non-overlapping receptive fields. Thus the vector corresponding to the long delta time signal, that is, either the first or third vector stored in the buffer, will add little information which is helpful in assigning phoneme estimates to the center vector $h_n$. Accordingly, the corresponding vector is replaced with all ZEROS. This ensures that the triples formed in block 304, i.e., vectors $p_n$ 306, do not contain non-contiguous data. The triple vector $p_n$ 306 thus covers an enlarged "window" in continuous speech, formed from data derived from three overlapping receptive fields.

In subsequent modeling the specific phoneme labels associated with the larger window are those of the central receptive field, so that the phonemes recognized are centered as much as possible in the larger window. Many phonemes, for example the "ou" in the word "thousand", are heard more distinctly over a relatively long time period and thus should be more easily recognized using this larger window. However, if the system is receiving SPEECH signals corresponding to rapid speech, the longer time period may result in more than one phoneme per window. Further nonlinear processing and speech modeling allow the system to recognize and separate such phonemes.

Referring to FIG. 12, enlarging the phoneme estimate time window at this point in the processing is more effective in phoneme recognition, for example, than increasing the size, that is, the relevant time period, of the receptive field. Increasing the time period covered by the receptive field increases the number of parameters, assuming the resolution of the data remains the same. Then, in order to perform nonlinear processing using the larger receptive field without unduly expanding the number of parameters the system must handle, the resolution of the data—either per time period or per frequency distribution—must be reduced. Lengthening the time window at this point in the processing, that is, after a first speech-element modeling step reduces the data by selecting data relating to particular speech elements, instead of lengthening the receptive field time period, allows the system to look at data representing a longer segment of the incoming SPEECH signal without unduly increasing the number of data parameters and/or without reducing the resolution of the data.

Referring still to FIG. 12, by enlarging the phoneme-estimate time window we eliminate some of the context-dependency labeling of the earlier speech recognition system-I. The speech-recognition system-I alters phoneme labels depending upon context. For example, if a vowel was preceded immediately by an unvoiced consonant or a voiced consonant, then the label of that vowel was changed accordingly. As a consequence, phoneme labels, particularly those for vowels, proliferated. In the present system, however, the great majority of phonemes have only one label, and the increased nonlinearity of the data conveys the context of the phoneme labels to the word/phrase determiner 14 (FIG. 1). The number of labels and thus spellings stored in the determiner is significantly reduced, and this reduction expedites the search for the appropriate word or phrase.

Figure 13:
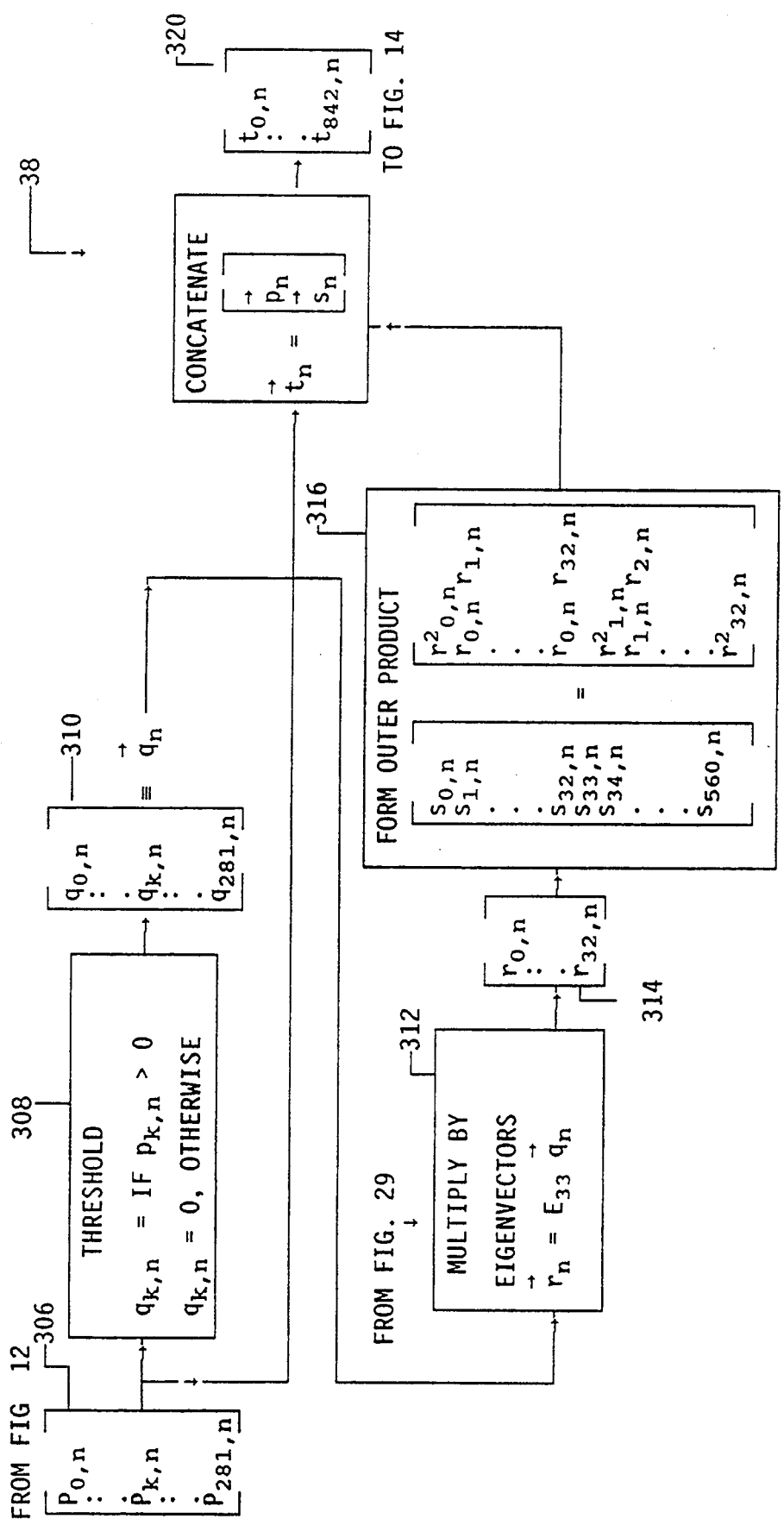
FIG. 13 is a block diagram depicting nonlinear processor-3, shown as block 38 in FIG. 2.

Referring now to FIG. 13, the output triple vector $p_n$ 306 from FIG. 12 is applied to the third nonlinear processor-3 38. This nonlinear processor is similar to nonlinear processor-2 30, shown in FIG. 10, with two differences. First, there is no fixed-parameter normalization here. Second, and more importantly, there is a threshold here.

Prior to forming the outer product in processor-3 38, the data are compared with a threshold in block 308. The threshold is set at zero. Vector $p_n$ 306 contains estimates of the likelihood of each speech element. Thus an element of vector $p_n$ that is below zero indicates that a speech element that has been processed by speech-element model-1 264 (FIG. 11) is unlikely to have occurred at the corresponding place in the concatenated window.

The rationale for applying the threshold 308 is as follows: Vector $p_n$ 306 is decomposed into eigenvector components in block 312, and then passed through an outer product in block 316 which greatly expands the size of the vector. The expansion in vector size means that a relatively large number of parameters will be devoted to processing the vector in subsequent processing. Hence, care should be taken to formulate a vector containing only the most important information before the expansion in size. In the interest of deploying parameters in the most efficient manner, it is better to ignore the model values of the great majority of speech elements that are unlikely to have occurred at a given time. These speech elements have model values below zero. Thus, using the threshold 308, what is passed to further nonlinear processing is characterized by the model values associated with the speech elements that are likely to have occurred.

Referring still to FIG. 13, vector $p_n$ 306 components exceeding the predetermined threshold are strategically decorrelated and reduced by multiplying the data by an eigenmatrix $E_{33}$ in block 312. The eigenmatrix $E_{33}$ is formulated from the eigenvectors associated with the thirty-three largest eigenvalues calculated from data in the development database corresponding to vector $q_n$ 310, as discussed in more detail with reference to FIG. 29 below. The data are thus reduced by selecting for further nonlinear processing only the components of the data lying in the directions of the thirty-three largest eigenvectors. The compromise between retaining signal information and reducing the number of parameters subjected to nonlinear processing results, at this point in the processing, in retaining approximately 50% of the information accounting for signal variance while reducing the number of parameters subjected to nonlinear processing from 282 to thirty-three.

The resulting data values, vector $r_n$ 314, are applied to block 316, where the complete outer product is formulated. The results of the outer product are then concatenated with the vector $p_n$ 306 to form an 843-element vector $t_n$ 320. This vector contains terms with a high degree of nonlinearity as well as all the components of vector $p_n$ 306. It thus contains the data on which the nonlinear processor-3 operated as well as the data which fell below the threshold.

Again, while we employ multiplication in step 316 because that is a simple way to produce nonlinear interaction results, other nonlinear functions can also be employed for this purpose.

Figure 14:
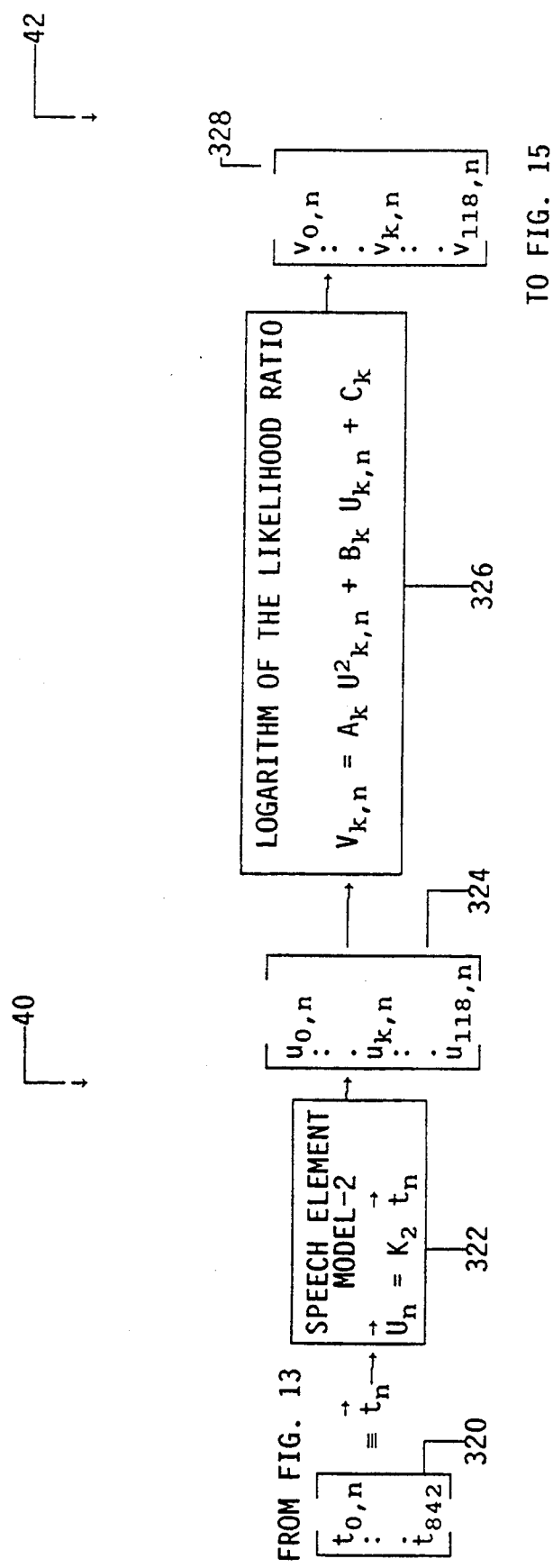
FIG. 14 is a block diagram illustrating speech-element model-2 and calculation of the logarithm of the likelihood ratio, shown as blocks 40 and 42 in FIG. 2.

The 843-element vector $t_n$ 320 is then applied to the second speech-element model-2 processor 322 shown in FIG. 14. The speech-element model-2 processor multiplies the data by a kernel $K_2$, producing a vector $u_n$ 324. Kernel $K_2$ has elements corresponding to the speech elements (which we refer to below as "phoneme isotypes") listed in Table 8, FIG. 43. Vector $u_n$ contains the speech element (phoneme isotype) estimates. The kernel $K_2$ is formulated from the development data as discussed with reference to FIG. 32 below. Phoneme isotypes are discussed in more detail below.

Kernels $K_1$ and $K_2$ differ in size and effect. Kernel $K_1$, discussed with reference to FIG. 11 above, contains elements which represent a simpler set of speech elements than for which we model using kernel $K_2$. These speech elements are listed in Table 7, FIG. 42. For example, kernel $K_1$ contains elements corresponding to the speech element "b", and each occurrence in speech of a "b" whether it is an initial "b", a bridge "_b_", etc. is mapped, using kernel $K_1$, to the entry "b". Kernel $K_2$ contains entries which distinguish between an initial "b" a bridge "_b_", etc. The speech elements associated with kernel $K_2$ are listed in Table 8, FIG. 43.

The speech element (phoneme isotype) estimates are next applied to the likelihood ratio processor 42, which translates each estimate into the logarithm of the likelihood that its speech element is present. The likelihood for each speech element is calculated assuming normality of the distributions of estimate values both when the phoneme is absent and when the phoneme is present. The logarithm ensures that further mathematical operations on the data may thereafter be performed as simple additions rather than the more-time-consuming multiplications of likelihood ratios.

Figure 15:
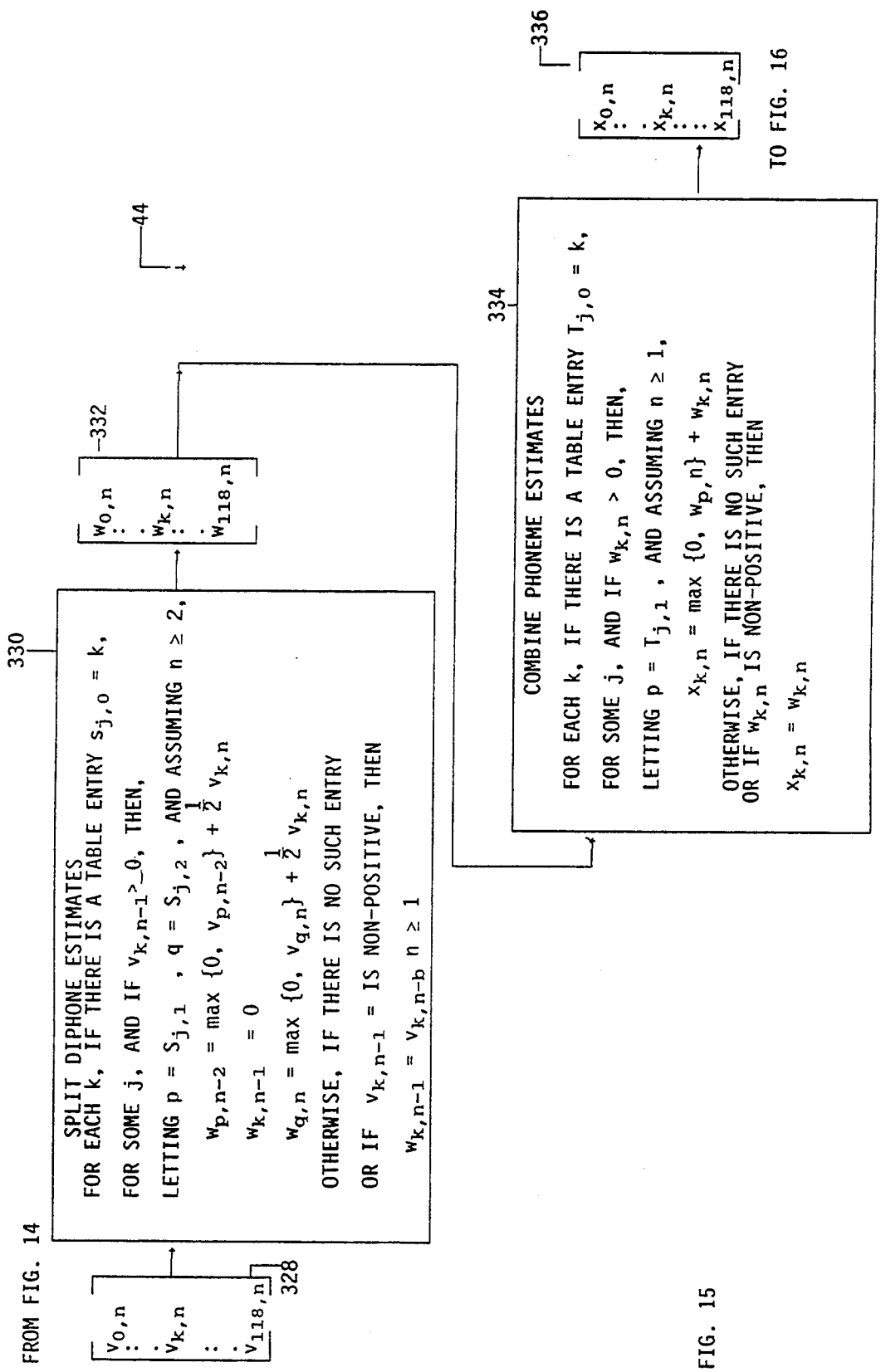
FIG. 15 illustrates phoneme isotype estimate rearrangement, shown as block 44 in FIG. 2.

The resultant logarithm of the likelihood ratios in vector $v_n$ 328 is applied to the phoneme estimate rearrangement processor 44 shown in FIG. 15. The rearrangement processor 44 manipulates the data into a form that is more easily handled by the Word/Phrase Determiner 14 (FIG. 2). While some of the rearrangement steps are designed to manipulate the data for the specific Word/Phrase Determiner used in the preferred embodiment, the simplification and consolidation of the data by rearranging the speech element estimates may simplify the determination of the appropriate words and phrase regardless of the particular word/phrase determiner used in the system.

The phoneme rearrangement processor manipulates the data such that each speech element is represented by only one label. Accordingly, the Word/Phrase Determiner 14 need only store and sort through one representation of a particular phoneme and one spelling for each word/phrase.

Each speech element estimate vector should include the estimates associated with one phoneme. However, some of the vectors may include diphone estimates as set forth in Table 8 (FIG. 43). Such speech element estimate vectors are split in block 330 in FIG. 15 into constituent phonemes. The estimates for the first portion of the diphone are moved back in time and added to signals from the earlier signal segment and estimates for the second portion of the diphone are moved forward in time and added to any signal data present in the later time segment. While the order of the phonemes is important, the placement in time of the phonemes is not. Most words and syllables are at least several of these 36-msec time units long. Thus, separating diphones into constituent phonemes and moving the phonemes in time by this small unit will not affect the matching of the estimates to a word or phrase.

Once the diphones are separated into constituent speech elements, the speech elements are reduced in block 334 to the smallest set of speech elements (which we refer to below as "phoneme holotypes") required to pronounce the words/phrases. These speech elements are listed in Table 9, FIG. 44. For instance, all final and bridge forms of phonemes are mapped to their initial forms. Thus the individual speech element scores are combined and negative scores are ignored.

Figure 16:
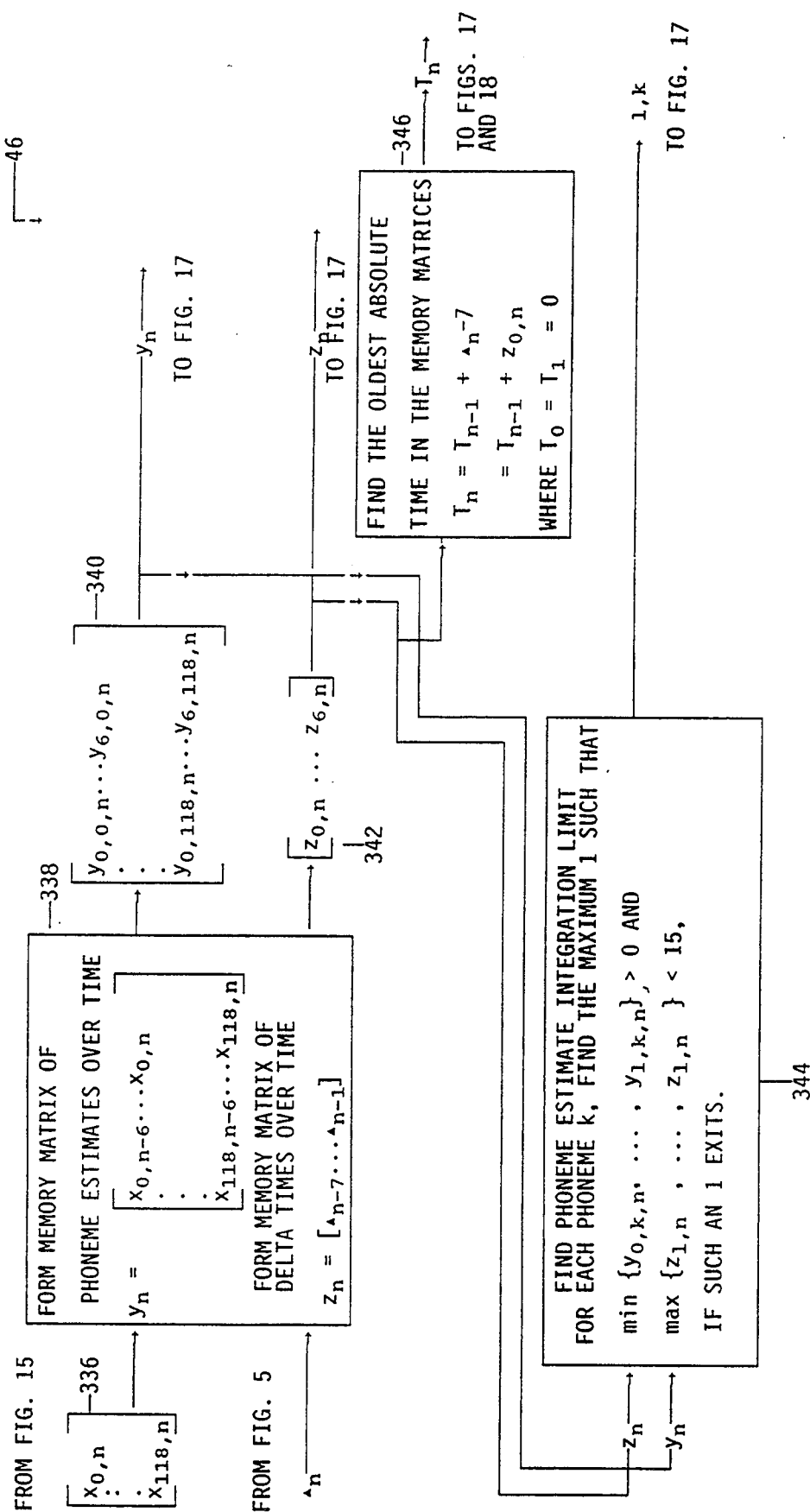
FIGS. 16, 17 and 18 together are a block diagram illustrating an estimator integrator, shown as block 46 in FIG. 2.
Figure 17:
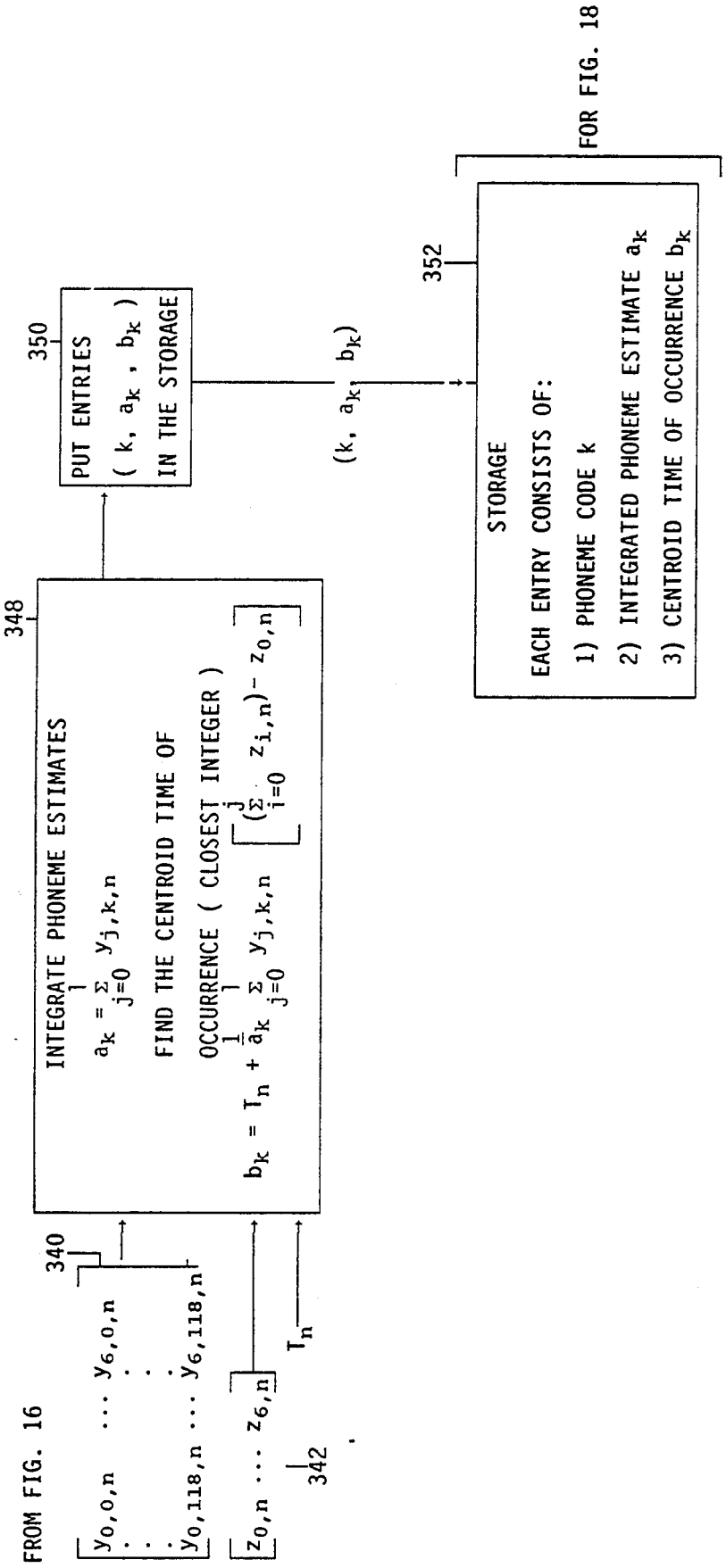
Figure 18:
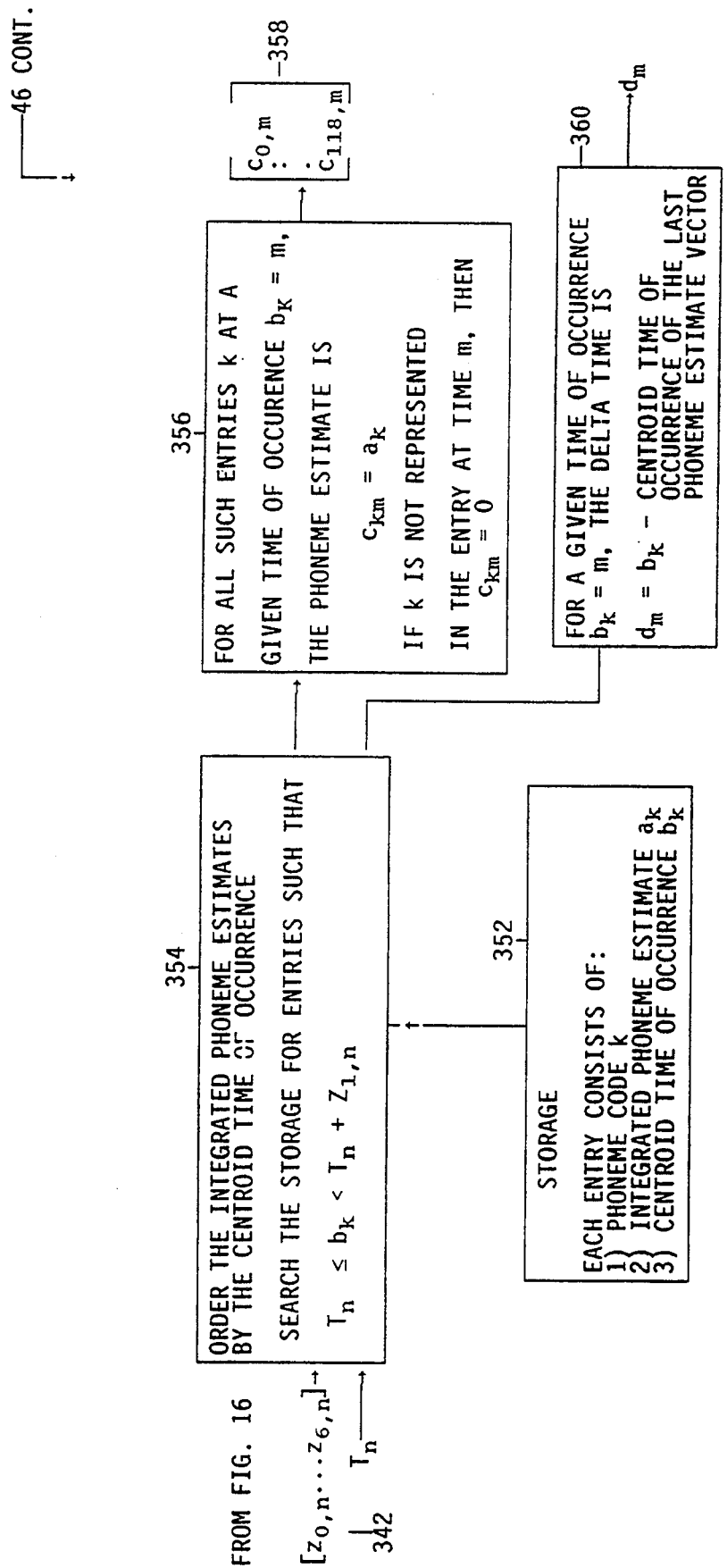

The simplified speech element (phoneme holotype) estimates are applied to the phoneme estimator integrator 46 which is shown in block diagram form in FIGS. 16–18. With reference to FIG. 16, scores for given phonemes are grouped over time in block 338 along with the associated delta time signal 22C from energy detect processor 22 (FIG. 5). Block 346 keeps track of the absolute time in the grouping. The scores for a given phoneme are then consolidated into one time location in blocks 344 and 348 (FIG. 17).

Referring now to FIG. 17, the summed phoneme estimate score is equated with the closest "centroid" time in block 348, that is, the time indicating the center of the weighted time period over which a particular phoneme is spoken. Times within this period are weighted by the phoneme estimate value. Then the associated phoneme label code, phoneme estimate value, and centroid time of occurrence are stored in a location of memory, as shown in block 352. The storage is accessed by block 352 in FIG. 18, and the entries are ordered by the centroid time of occurrence, so as to provide a correct time ordering. Output phoneme estimates $c_m$ 358 and the associated delta time values $d_m$ are then accessed by the Word/Phrase Determiner 14 (FIG. 2). The subscripts have changed once again, from "n" to "m", to indicate that the outputs of FIG. 18 have a time base distinct from that of the inputs.

The operation of the speech-element model-2 processor 40, and the rearranging and consolidating of the phoneme estimates produced by the system are illustrated by considering the processing of the word "yesterday." The set of speech elements for which the speech is modeled includes subsets, each of which consists of speech elements that are all what we call "isotypes" of a single phoneme "holotype". For example, the speech elements "_v", "_v_" and "v" of Table 8 are all isotypes of the same holotype, in this case "v". The phoneme isotype estimate labels that are assigned to the speech by the speech-element model-2 processor, ignoring noisy or bad estimates, may be:

i J; j; jE; E; _s; isol.t; t R; R _d; _d_; d eI; eI;

Here we have examples of several different phoneme possibilities. This is a somewhat schematic version of the phonemes which appear in clearly articulated speech. Each of the listed elements represents those phoneme isotypes that would appear in contiguous windows in the speech, each window corresponding to a detected receptive field. The symbols between semicolons occur in the same window.

The syllabic form "J" precedes the "j" glide as if the utterance were "ee-yesterday." The "j" glide appears again in the diphone "jE." The next window re-iterates the vowel "E." The final form of "s" appears next, as "_s", indicating that there is some voicing heard before the fricative but not enough to be identified as a particular vowel. The unvoiced stop "t" is expressed here first in its isolated form "isol.t", indicating that there is no voicing heard in the window, and then in its initial form "t." The next window contains two phonemes, another initial "t" and a syllabic "R", which is re-iterated in the next window. The "d" appears first as a final "_d" then in its "bridge" form "_d_", and then as an initial "d." The bridge form contains voicing from both the "R" and the final vowel "eI" in the window, but not enough of each of these to justify their being labeled in the same window with the bridge. The final vowel is repeated.

If the SPEECH signal contains noise, various windows may contain phoneme isotype estimates relating to the noise. These estimates, typically with smaller likelihood numbers, are processed along with the phoneme estimates corresponding to the spoken word or phrase. The effect of these "noise" phoneme isotypes is an increase in the time it takes the word/phrase determinator 10.(FIG. 1) to process the phoneme estimates.

Referring again to the manipulation of the phoneme isotype estimates listed above, block 330 (FIG. 15) splits the diphone "jE" into its constituent phonemes:

J; j; j E; E; _s; isol.t; t R; R _d; _d_; d eI; eI;

Block 334 then substitutes phoneme holotypes for each occurrence of any of its isotypes:

j; j; j E; E; s; t; t R; R d; d; d eI; eI;

Finally, the estimator integrator 46 (FIGS. 16–18) consolidates instances of the each phoneme holotype, so that multiple instances are eliminated:

j; E; s; t R; d; eI;

The result is the phoneme estimates for the speech. Each phoneme is treated here as though it had occurred at a single centroid time of occurrence. These centroid times are no longer restricted by the modulo-3 constraint of the detects (block 134, FIG. 5). However, the order of the various labels is retained to ensure the correct phonetic spelling of the word. Only those phonemes which are close enough to be considered in the same word or phrase are so consolidated.

Note that in this example the consolidated "t" is assigned to the same window as the syllabic "R." This will occur if the centroid times of occurrence of the two phonemes are sufficiently close.

PARAMETER DEVELOPMENT

Figure 19:
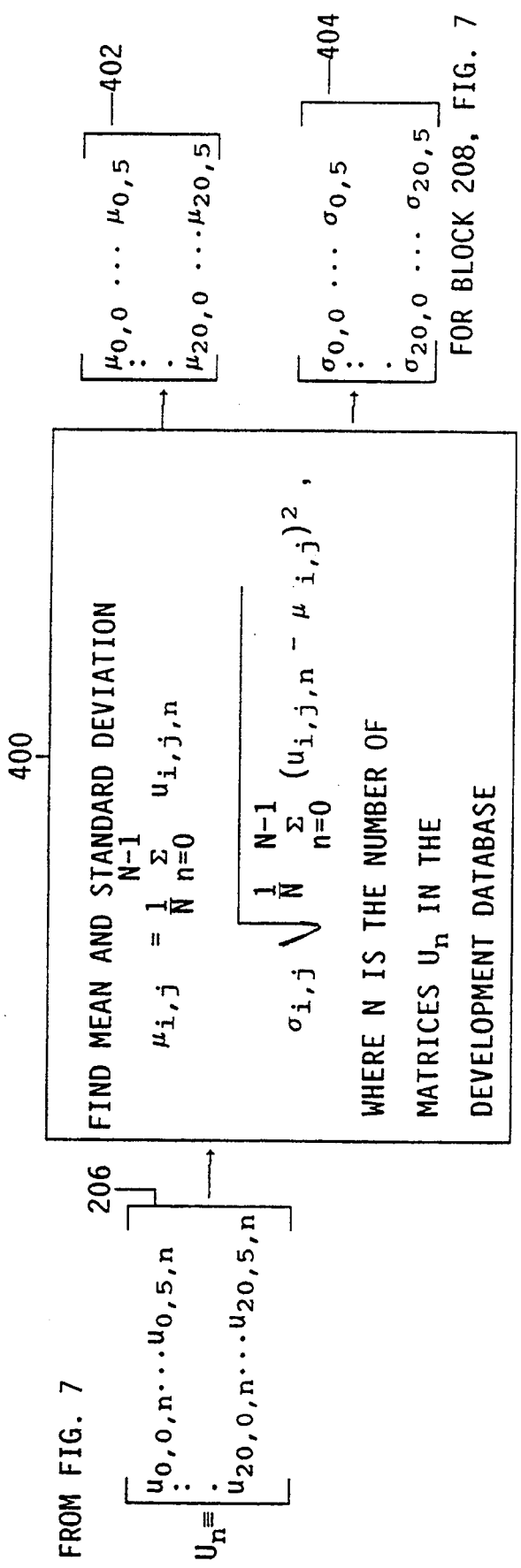
FIG. 19 illustrates the calculations of parameters used in the adaptive normalizer of FIG. 7.

The development of the parameters used in calculating the phoneme estimates is discussed with reference to FIGS. 19–35. FIG. 19 depicts the calculation of the fixed parameters $\mu_{i,j}$ and $\sigma_{i,j}$ used in normalizing the data corresponding to the incoming speech in the adaptive normalizer 26 (FIG. 7). The fixed parameters used throughout the processing, including the mean and standard deviation values, are calculated using the data in the development database.

The development database is formulated from known speech signals. The known signals are applied to the speech processor and the data are manipulated as set forth in FIGS. 3–18. Then various parameters useful in characterizing the associated phonemes at various points in the processing are calculated for the entire development database. These calculated, or fixed, parameters are then used in calculating the phoneme estimates for incoming signals representing unknown speech.

Referring to FIG. 19, a mean, $\mu_{i,j}$, is calculated for each of the elements, $u_{i,j,n}$ of the "N" matrices $U_n$ 206 formulated from the development data. First, the corresponding elements from each of the $U_n$ matrices in the development data are averaged, resulting in a matrix $\mu$ 402 with the various calculated mean values as elements. Next the standard deviation values, $\sigma_{i,j}$, of the corresponding elements of the $U_n$ matrices are calculated using the associated mean values, $\mu_{i,j}$, resulting in a matrix $\sigma$ 404 with the various calculated standard deviation values as elements. The fixed mean and standard deviation parameters are thereafter used in the adaptive normalizer to normalize each element of the matrix $U_n$ formulated for the incoming, unknown speech.

Figure 20:
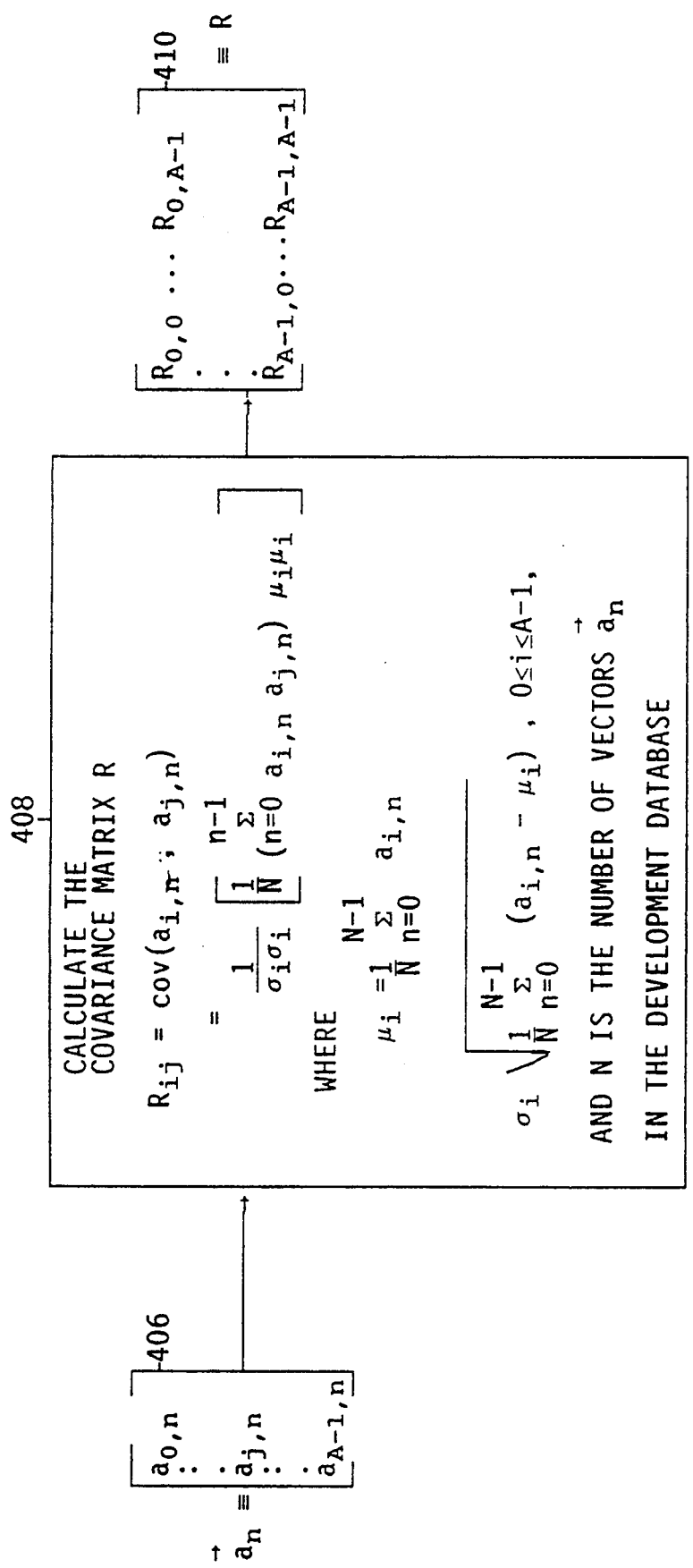
FIG. 20 illustrates the calculation of a covariance matrix R for calculating parameters used, for example, in the nonlinear processor-2 of FIG. 10.

FIG. 20 defines a covariance matrix R 410 which is used in calculating various eigenmatrices. The covariance matrix R corresponding to the N input vectors $a_n$ 406 formulated for the development data is calculated as shown in block 408. The covariance matrix R is then used to calculate eigenvectors and associated eigenvalues as shown in FIG. 21.

Figure 21:
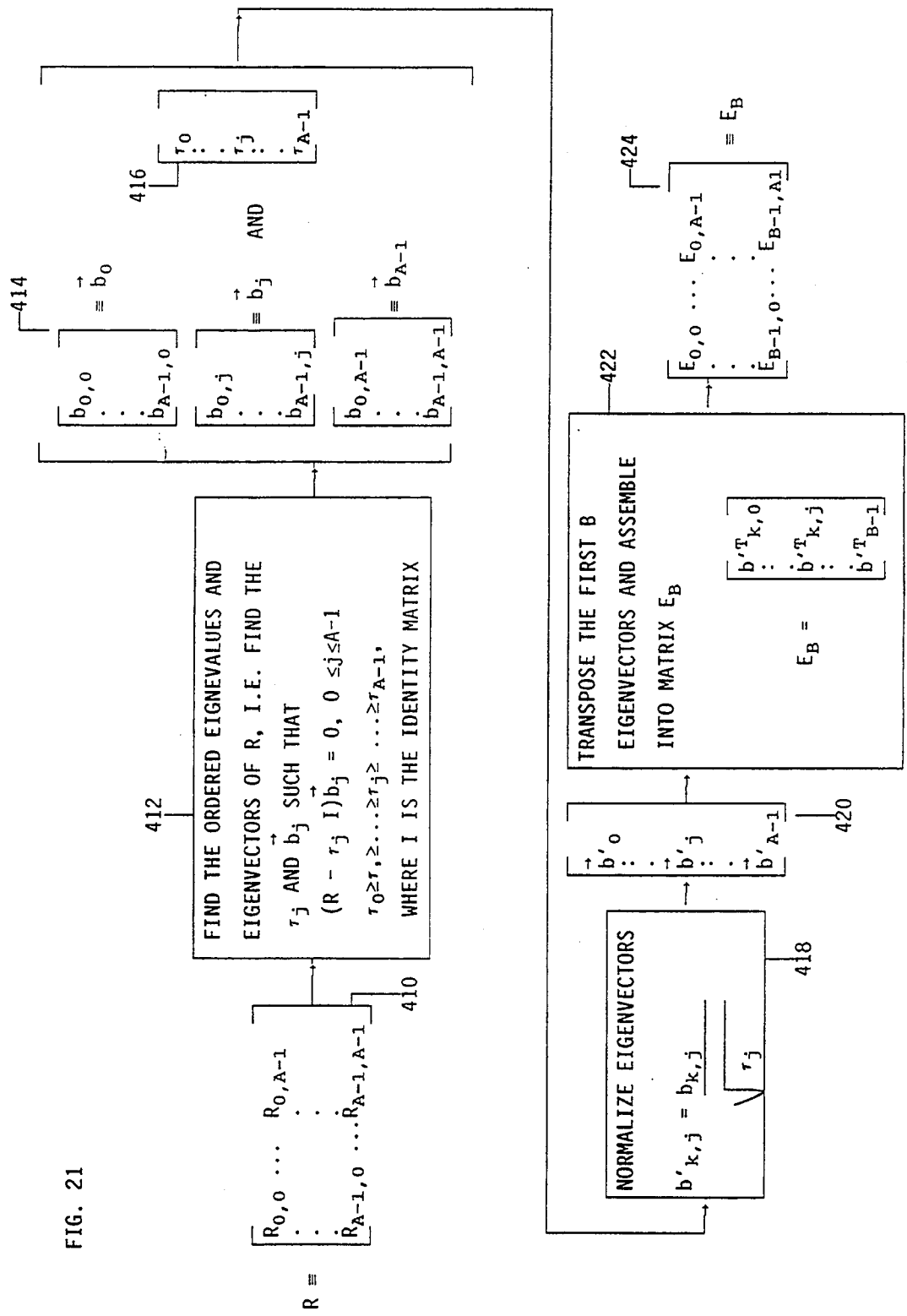
FIG. 21 illustrates the calculation of an eigenmatrix $E_B$, using covariance matrix R of FIG. 20.

Referring to FIG. 21, the eigenvalues are calculated in block 412 and ordered, with vector $b_0$ (from 414) being the eigenvector having the largest eigenvalue and $b_{A-1}$ being the eigenvector having the smallest eigenvalue. The eigenvectors are then normalized by dividing each one by the square root of the corresponding eigenvalue to produce a vector $b'_n$ 420. The first B normalized eigenvectors, that is, the B normalized eigenvectors corresponding to the B largest eigenvalues, are assembled into eigenmatrix $E_B$ 424. The eigenmatrix $E_B$ is not required, by definition, to be a square matrix. The superscripts "T" in block 422 denote the transposes of the vectors as written.

FIG. 22 depicts the calculation of eigenmatrix $E_{26}$ 432 used in nonlinear processor-2 30 (FIG. 10). The eigenmatrix $E_{26}$ is calculated using the calculation method described with reference to FIG. 21. The covariance matrix R 410 required for the calculation of the eigenmatrix is formulated from the development data as shown in FIG. 20. The eigenmatrix $E_{26}$, containing the twenty-six eigenvectors associated with the largest eigenvalues, is then used to decorrelate the data relating to the incoming speech in block 240 of nonlinear processor-2 (FIG. 10).

Figure 23:
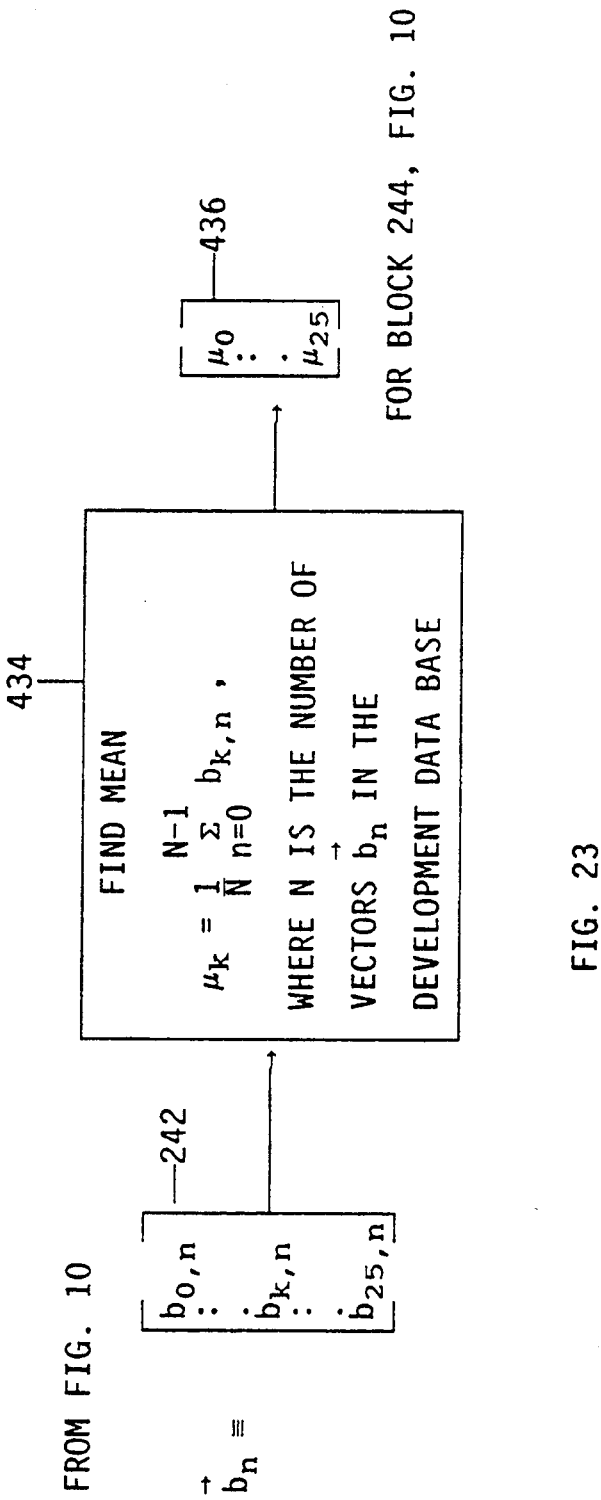
FIG. 23 illustrates the calculation of further parameters used in the nonlinear processor-2 of FIG. 10.

FIG. 23 depicts the calculation of the mean values used in the fixed-parameter normalization-2 processor 244 (FIG. 10). The processor 244 normalizes the twenty-six data elements associated with the selected twenty-six eigenvectors. Thus the mean values of the elements in the N development database vectors corresponding to vector $b_n$ 242 are calculated.

Figure 24:
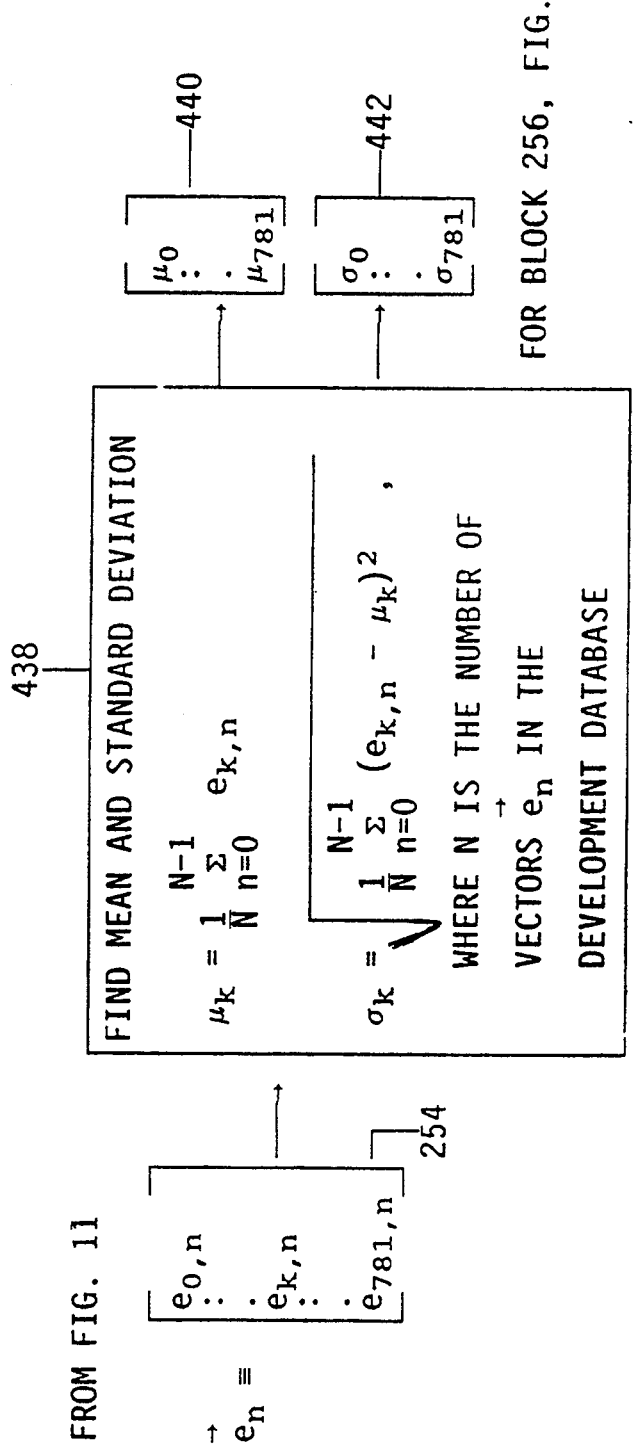
FIG. 24 illustrates the calculation of parameters used in the normalization processor of FIG. 11.

FIG. 24 similarly shows the calculation of the parameters used in the fixed-parameter normalization-3 processor 256 shown in FIG. 11. The means and standard deviations for the corresponding N vectors $e_n$ 254 in the development database are calculated resulting in a vector $\mu$ 440 containing the calculated mean values and a vector $\sigma$ 442 containing the calculated standard-deviation values.

Figure 25:
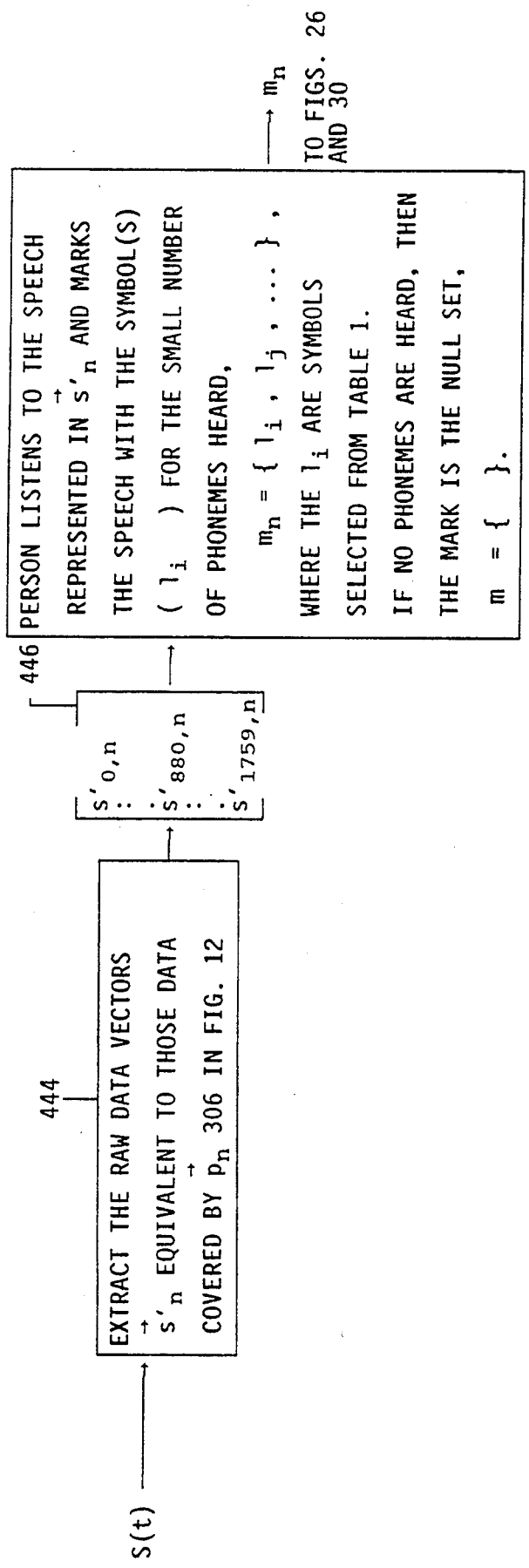
FIG. 25 illustrates marking of the speech signal.

FIG. 25 depicts marking of the speech. The segments of the development data input SPEECH signal S(t) are extracted to form a "window" into the speech, represented by vector $s'_n$ 446. The windows are selected to correspond sometimes to the time width of the receptive field matrices $U_n$ 206 (FIG. 6), represented also by the vectors $h_n$ 266 (FIG. 12), and sometimes to the time width of the overlapped triples, represented by the vectors $p_n$ 306 (FIG. 12), as discussed below. The former time width corresponds to 1184 data samples of the input SPEECH signal S(t); the later time width corresponds to 1760 such samples. Block 444 of FIG. 25 shows the extraction of the longer window. If the shorter window were selected, then the window would be formed by the 1184 samples centered about element $s'_{880,n}$. The windowed speech is then associated with phonemes by a person listening to the speech, as shown in block 448. The listening person thus marks each such window as containing the particular phonemes he or she hears, if any.

The time width of the window selected by the listening person depends upon the number of phonemes heard and upon the clarity of the sound. Phonemes in the longer window often can be heard more easily, but the longer window often introduces more phonemes in a window, and hence more ambiguity in marking. The choice thus represents a trade-off of clarity of the speech heard against time resolution of the resultant labels.

If all the marking were done with the shorter window, then the labels would correspond to the time width of the speech used by speech-element model-1 264 (FIG. 11). The labels would be "matched" to this model, but would be "mismatched" to speech-element model-2 322 (FIG. 14). Likewise, if all the marking were done with the longer window, then the labels would be matched to the second model but mismatched to the first. Ideally, the labels always would be matched to the model in which they are used, and the person listening would generate two complete label sets. There is, however, great commonality in what is heard with the different window widths. In the interest of easing the burden of marking the speech, the listening person is permitted to select the window time width to best advantage for each label instance.

Figure 26:
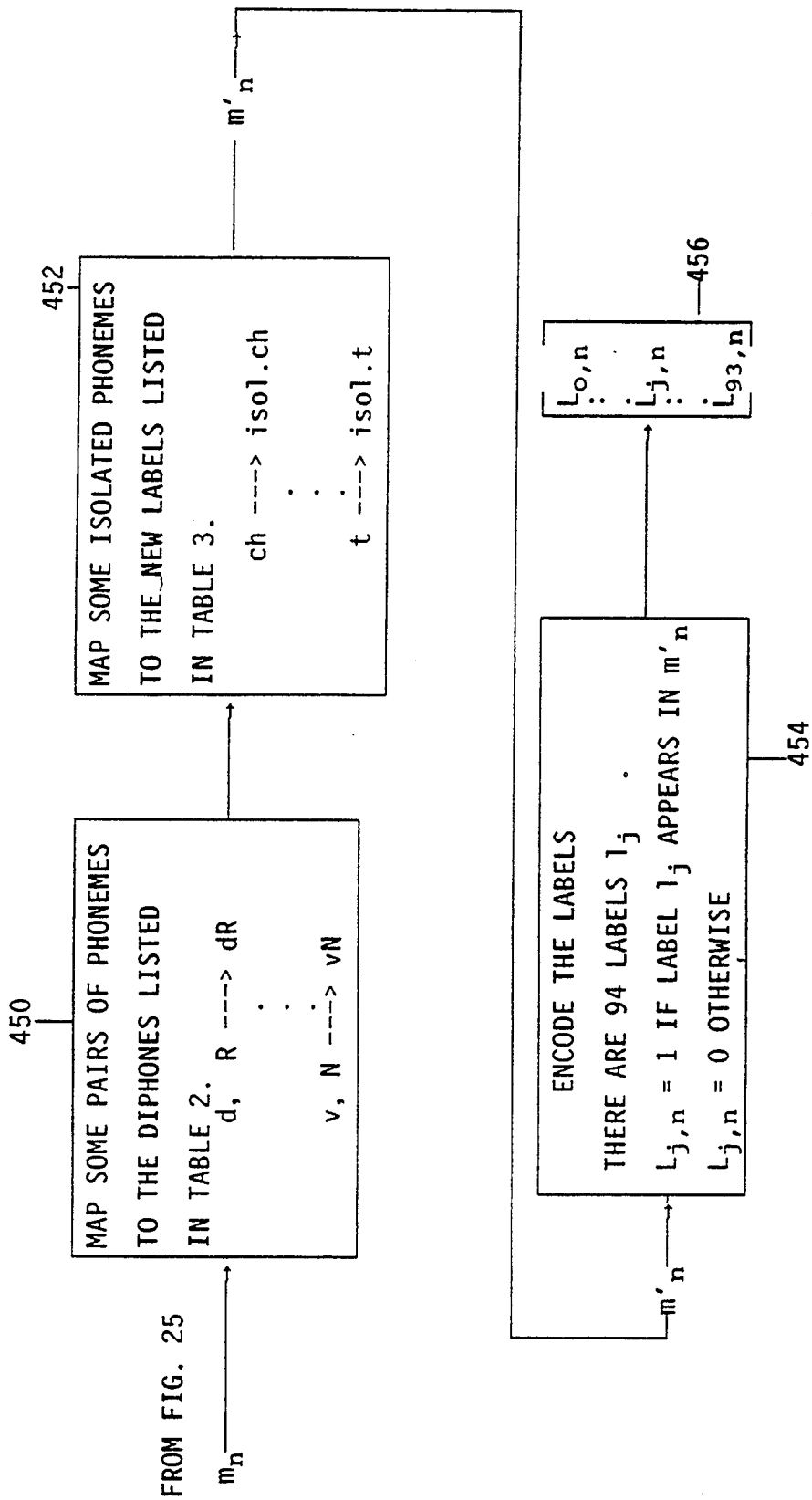
FIG. 26 illustrates the determination of speech label vectors used in formulating a kernel.

FIG. 26 shows the processing of the labels after they are marked by the person. If two phonemes are heard in a window, then they may constitute a pair that are mapped to diphone labels as shown in block 450. If only one phoneme is heard in a window, then that phoneme may be one of the unvoiced consonants which are mapped to isolated speech element labels as shown in block 452. If more than two phonemes are heard, then pairs of phonemes may be mapped to diphone labels and others may be mapped to single phonemes. In this last case, if the window is the longer one, the person marking the speech may select the shorter window and listen again to reduce the number of phonemes heard in a window. The mappings are done automatically after the marking is complete, so that the actual labels entered by the person are preserved.

The labels selected for marking the speech are shown in Table 1 (FIG. 36). These speech element labels are selected based, in part, on experience. For example, experience shows that some particular phoneme is likely to follow another. Some of these labels are thereafter refined to include an ordering and/or combination of the phonemes, for example, into diphones. The number of labels used throughout the processing is larger than the number of labels used in previous speech-recognition system-I. Such a large number of labels is used because, unlike the previous system in which a trigger mechanism is used to indicate the start of a phoneme and thus the start of the processing, the current system may detect a phoneme anywhere within the signal segment window, and processing may be begun, e.g., in the middle of a phoneme. Thus the system uses more labels to convey, after further processing, the context of the detected phoneme.

Referring again to FIG. 26, the labels attached to a signal segment are encoded in block 454 to from a label vector $L_n$ 456. The label vector $L_n$ 456 contains elements representing each of the ninety-four possible speech element labels shown in Table 1 (FIG. 36), as well as the new phoneme labels generated in blocks 450 and 452. The resulting vector has elements that are 1's for speech element labels heard in the segment and elements that are 0's for labels not heard. The label vector is then applied to the parameter development circuit shown in FIG. 27.

Figure 27:
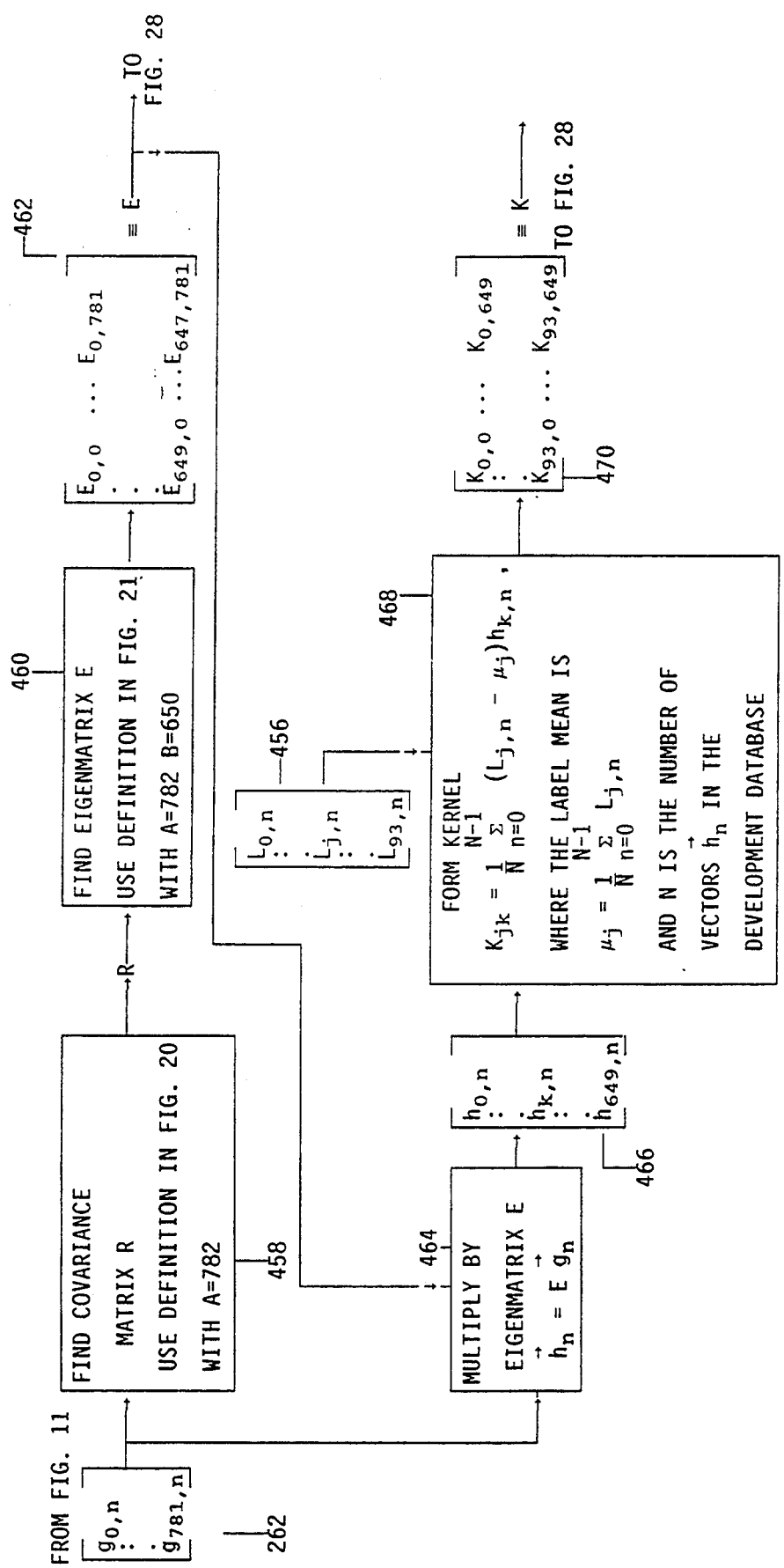
FIG. 27 illustrates calculation of eigenmatrix and kernel parameters for further calculating of parameters used in speech-element model-1 processor of FIG. 11.
Figure 28:
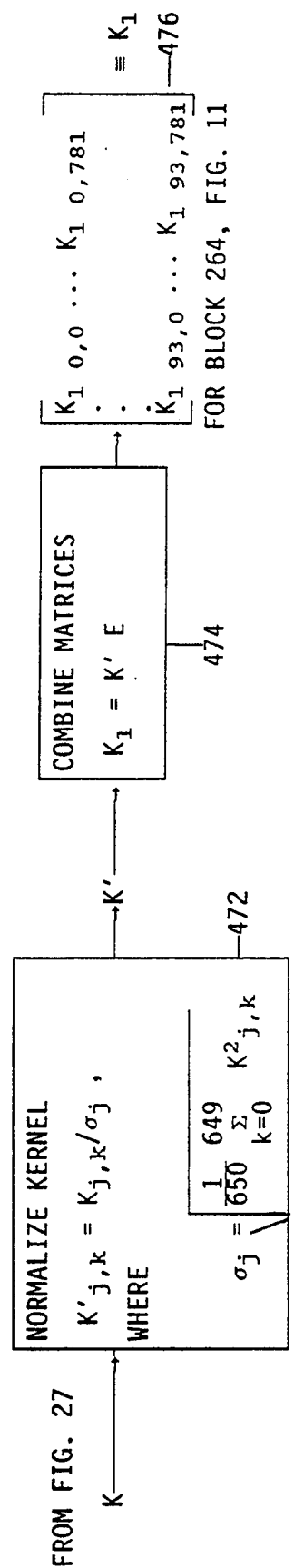
FIG. 28 illustrates the formulation of a combined kernel $K_1$ using the parameters of FIG. 27, the combined kernel is then used in the speech-element model-1 processor of FIG. 11.

FIG. 27 depicts the calculation of an eigenmatrix E 462 and a kernel K 470 used in formulating the combined kernel $K_1$ 476 (FIG. 28). A covariance matrix R is calculated for the development database vectors $g_n$ 262. The vectors $g_n$ are the signal data representations that are thereafter applied to speech-element model-1 34 (FIG. 11). The calculated covariance matrix R is then used to formulate the associated eigenmatrix E following the calculations discussed above with reference to FIG. 21.

The vectors $g_n$ 262 are then multiplied by the eigenmatrix E 462 to form decorrelated, data-reduced vectors $h_n$ 466. The de-correlated vectors $h_n$ have 650 elements, associated with the 650 largest eigenvalues, as opposed to the 782 elements of speech data in vectors $g_n$. Thus the number of parameters is strategically reduced and the most important data for speech recognition are retained. The retained information includes information relating to approximately 99.97% of the signal variance. Reducing the data at this point reduces the size of the associated kernel K 470 and also the size of combined kernel $K_1$ to a more manageable size without sacrificing much of the information which is important in phoneme estimation.

Kernel K 470 is formulated using the reduced 650-element vector $h_n$ 466. Each row of elements, $K_{ij}$, of kernel K is formed by multiplying the corresponding element of label vector $L_n$ 456 by the elements of vector $h_n$. The elements of label vector $L_n$ 456 are normalized before the multiplication by subtracting the mean values formulated from the elements of the N label vectors in the development data base.

The kernel K 470 is used in calculating the kernel K', which is then used to calculate "combined" kernel $K_1$ 476 as shown in FIG. 28. Kernel K is first normalized, by dividing each of its elements by the associated standard deviation value, producing K'. The normalized kernel K' is then combined with the eigenmatrix E 462. Combined kernel $K_1$ is thereafter used in speech-element model-1 34 to assign preliminary labels to the incoming speech and reduce the data to a subset of likely labels.

Figure 29:
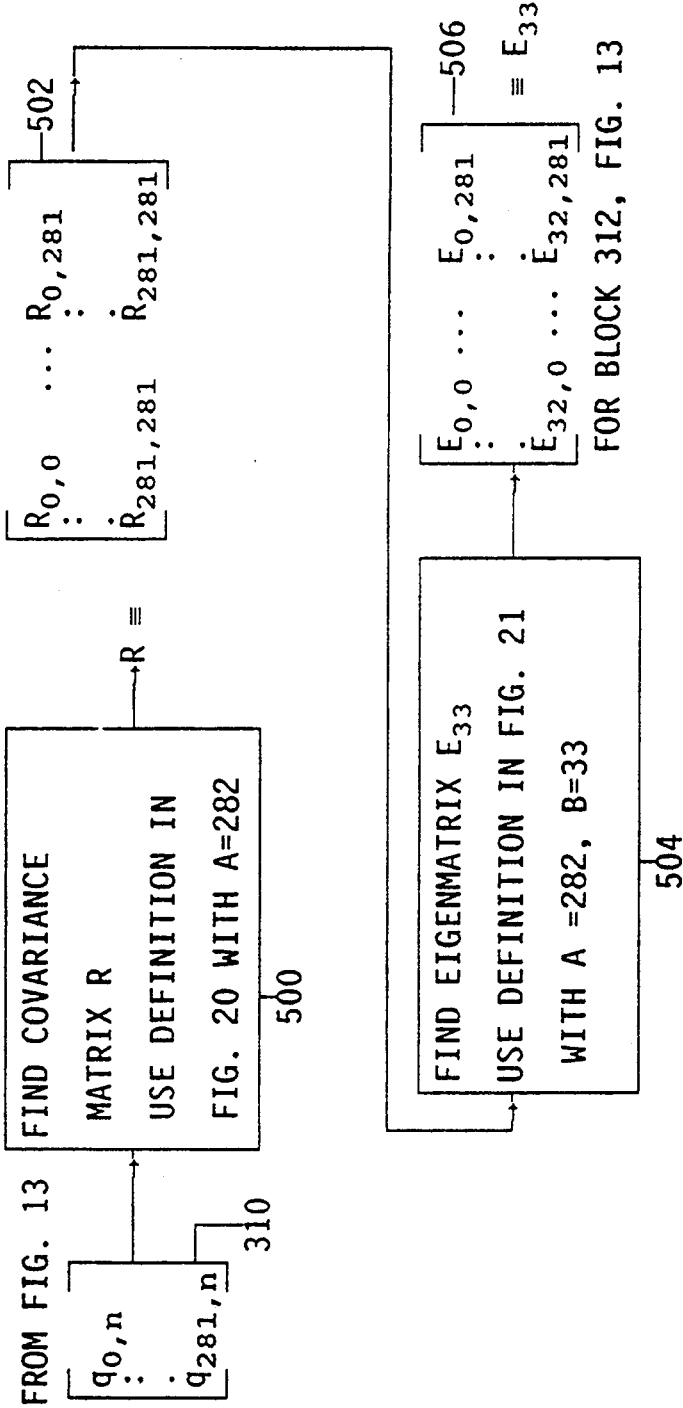
FIG. 29 illustrates the calculation of eigenmatrix $E_{33}$, used in nonlinear processor-3 shown in FIG. 13.

FIG. 29 depicts the calculation of eigenmatrix $E_{33}$ 506. The eigenmatrix $E_{33}$ contains the thirty-three eigenvectors associated with the thirty-three largest eigenvalues. The eigenmatrix $E_{33}$ is calculated in the same way as the eigenmatrix discussed with reference to FIG. 21 above. This eigenmatrix $E_{33}$ is then used to select the data values representing the incoming speech which are associated with the thirty-three largest eigenvectors.

Figure 30:
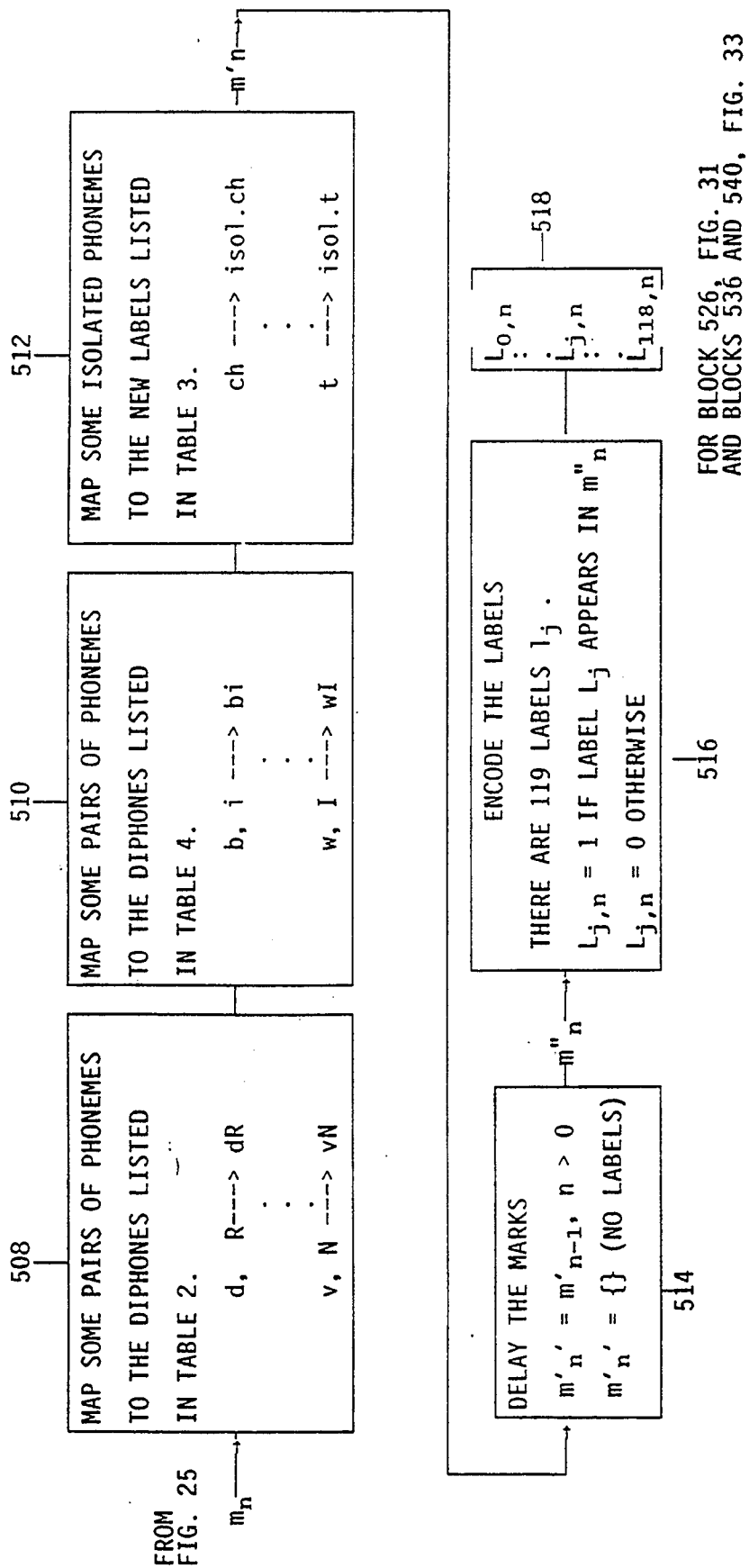
FIG. 30 illustrates the determination of speech label vectors used in formulating another kernel.
Figure 32:
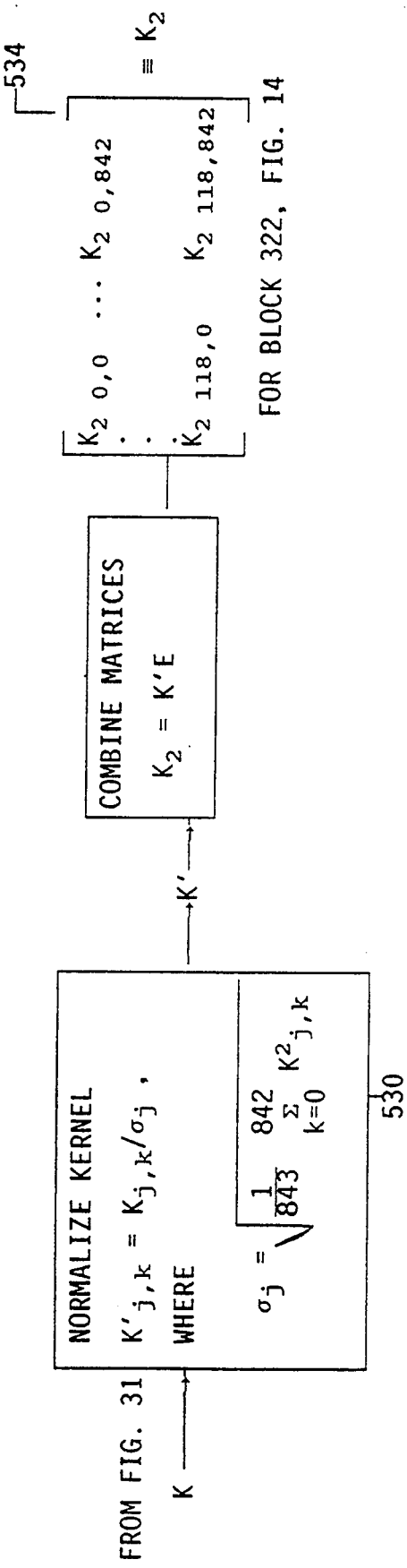
FIG. 32 illustrates the formulation of a combined kernel $K_2$ using the parameters of FIG. 31, the combined kernel is then used in the speech-element model-2 processor of FIG. 14.

FIG. 30 depicts speech label vectors used in formulating a second combined kernel, $K_2$ 322 (FIG. 32). The set of labels, which are phoneme isotype labels, differs from that used in calculating $K_1$ 476 (FIG. 28) as follows: The preliminary labels assigned to the data in speech-element model-1 34, shown in Table 7 (FIG. 42) are mapped in blocks 508–510 either to diphone labels in Tables 2 or 4 (FIGS. 37 and 39) or to isolated phoneme labels in Table 3 (FIG. 38), as appropriate. The mapping requires delaying the processing by one time unit in block 514. The delay aligns the labels with the center vector of the data triple formed in processor 36 (FIG. 12). The labels are then encoded to form a 119-element label vector $L_n$ 518.

Figure 31:
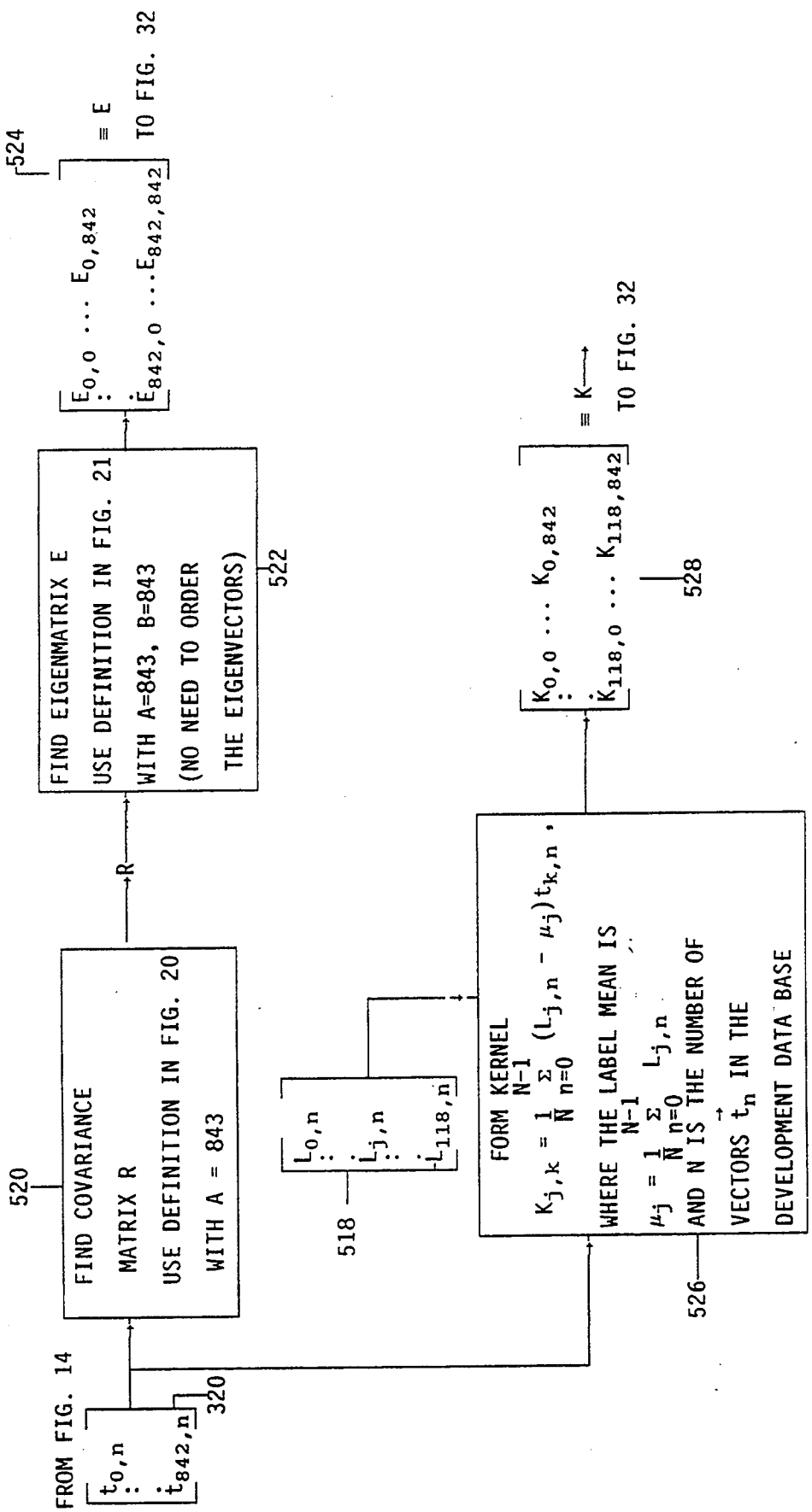
FIG. 31 illustrates calculation of eigenmatrix and kernel parameters for further calculating of parameters used in speech-element model-2 processor of FIG. 14.

FIGS. 31 and 32 illustrate the calculation of the combined kernel $K_2$ 534. Using the label vector $L_n$ 518, the kernel $K_2$ is calculated in the same manner as the earlier described combined kernel $K_1$ 476 (FIGS. 27 and 28); namely, a square eigenmatrix E 524 is calculated to decorrelate the data in the speech data vector $t_n$ 320. Then a kernel K' is calculated using the label vector $L_n$ 518. The kernel K' and the eigenmatrix E are then multiplied to form the combined kernel $K_2$. Kernel $K_2$ is used in speech-element model-2 40 to reduce the data and formulate phoneme isotype estimates by associating the data with the 119 possible phoneme isotype labels.

Figure 33:
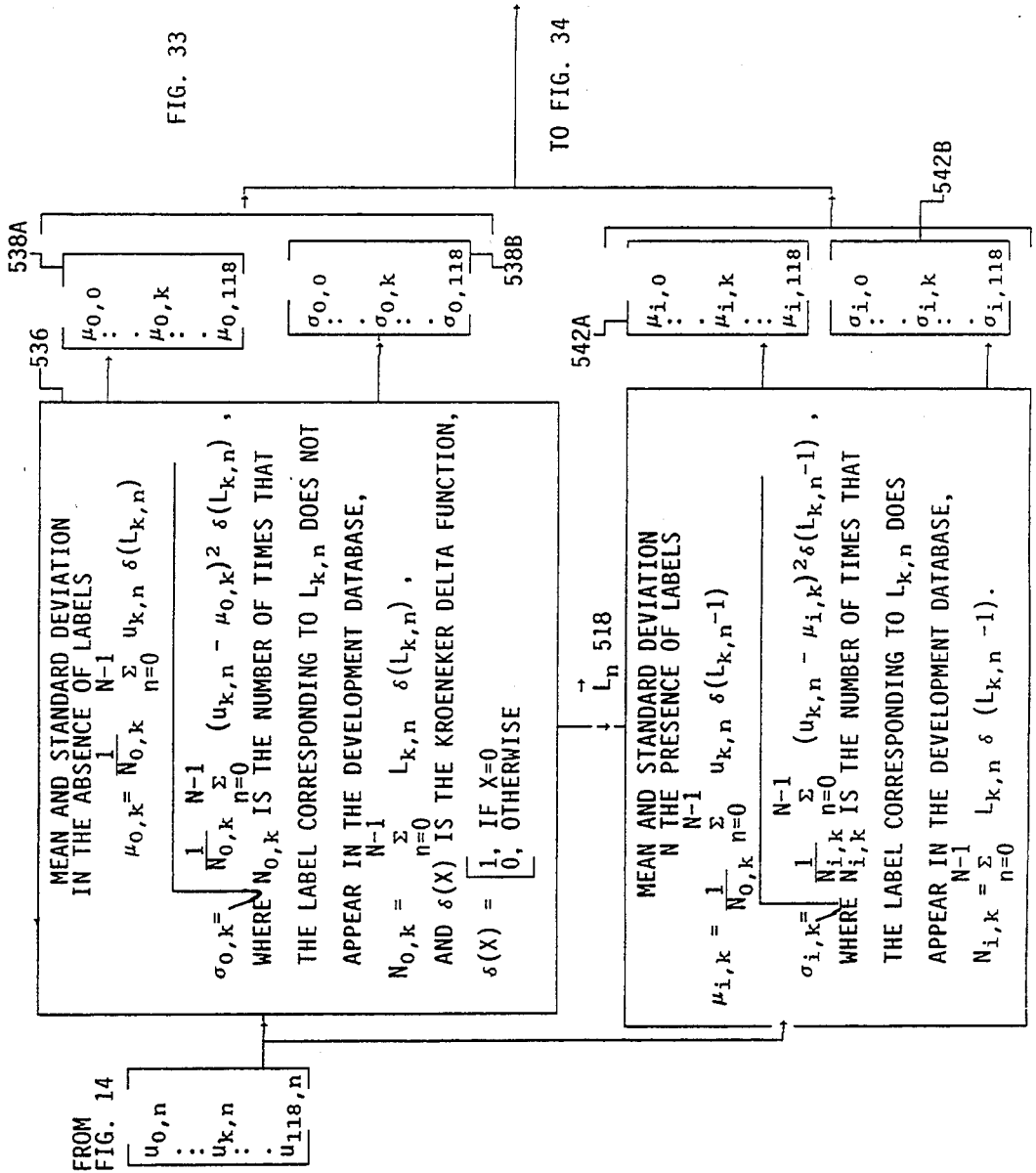

FIGS. 33 and 34 illustrate the calculation of parameters used in formulating the logarithm of the likelihood ratio (FIG. 14). The likelihood ratio incorporates parameters formulated from the development database and assigns likelihood values to the phoneme isotype estimates associated with the incoming speech. The estimates may thus be multiplied by adding, and divided by subtracting, after they are translated to logarithms.

Specifically, with reference to FIG. 33, the development data vector $u_n$ 324 and the label vector $L_n$ 518 (FIG. 30) are each applied to circuits 536 and 540. Blocks 536 and 540 calculate mean and standard deviation values for elements of the input vector $u_n$ and accumulate them separately for instances when the corresponding elements in label vector $L_n$ 518 appear in the development database and when they do not appear. Thus block 536 accumulates statistics for instances when the corresponding phoneme is not heard in the input speech. For each individual phoneme, these instances account for the vast majority of the data, since a given phoneme is usually not heard. Block 540 accumulates statistics for instances when the corresponding phoneme is heard in the input speech. Such instances are in the minority.

The resulting mean and standard deviation values (vectors 538A-B and 542A-B) are applied to a de-rating circuit 544 (FIG. 34) which adjusts the data values to compensate for the resulting difference in accuracy between assigning phoneme estimates to known data which are in the development database and assigning them to unknown data. The mean and standard deviation values are adjusted by multiplying them by coefficients $a_i$ and $b_i$ which are the ratio of, on the one hand, such values averaged over all instances in a test database to, on the other hand, such values averaged over all instances in the development database.

The test database is smaller than the development database and the data in the test database have not been used in calculating any of the other fixed parameters. The test data contain fewer calculated phoneme estimates, and the estimates are assumed to be less robust than those associated with the development database. The coefficients $a_i$ and $b_i$ are thus a gauge of how much the likelihood ratio parameters formulated from the development database should be scaled for incoming new speech.

Referring to FIG. 34, the mean values are scaled using the coefficients $a_i$ and $b_i$ as set forth above. The de-rated values are then applied to circuit 546 which formulates polynomial coefficients for the likelihood ratio circuit 326 (FIG. 14).

Figure 35:
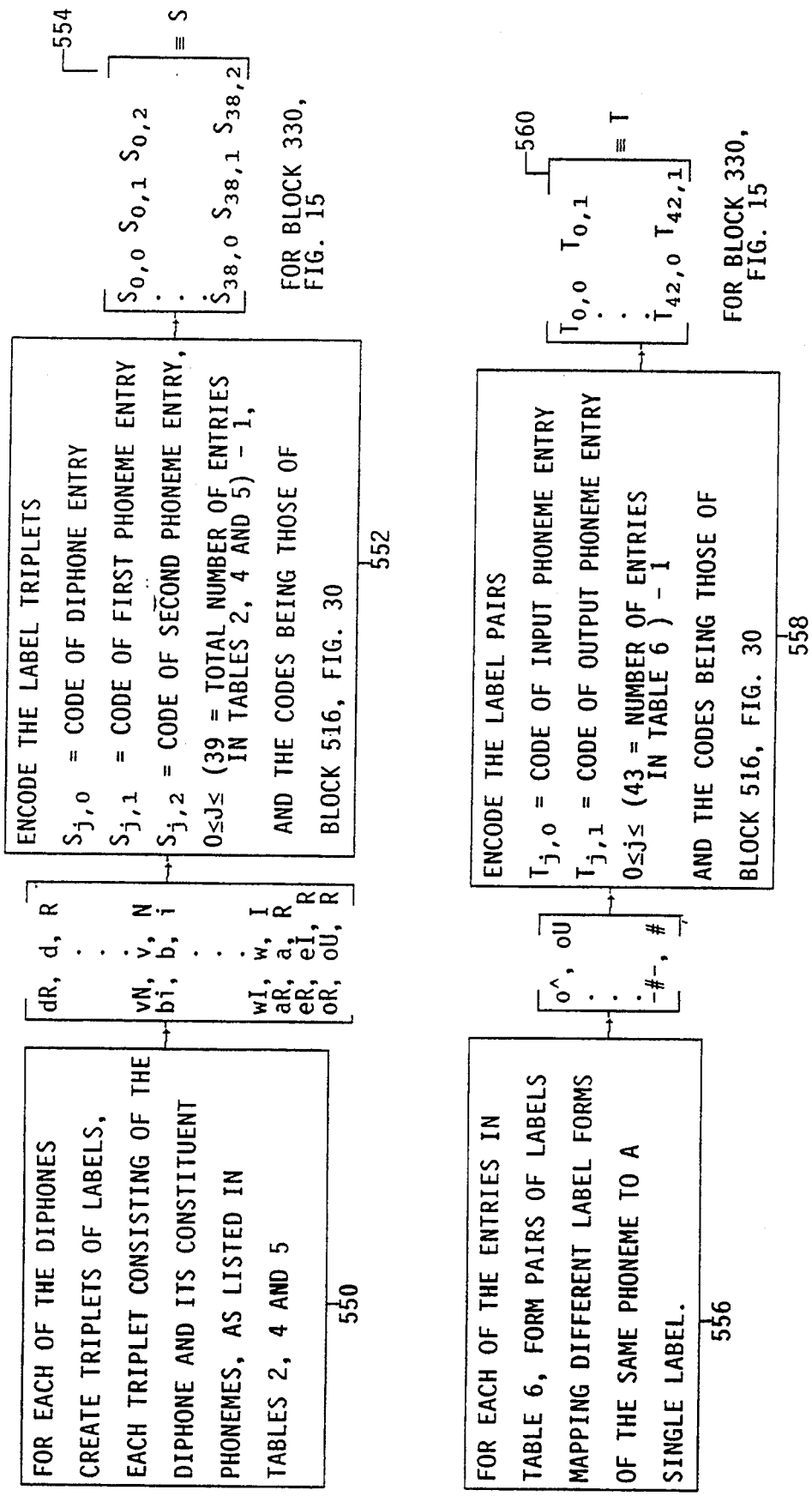
FIG. 35 illustrates the generation of tables for diphone and phoneme maps which are used in the phoneme estimate rearrangement depicted in FIG. 15.

After the phoneme isotype estimates are transformed into logarithms of the likelihood ratio, the phoneme isotype estimates are rearranged and consolidated in phoneme rearrangement processor 44 (FIG. 15) and estimator integrator 46 (FIGS. 16–18). FIG. 35 illustrates the generation of the maps used in rearranging and consolidating the estimates. With reference to FIG. 35, a mapping matrix S 554 is formulated for diphones, mapping the diphones to the constituent speech elements. Tables 2, 4 and 5 (FIGS. 37, 39 and 40) contain the diphones and constituent speech elements. A second mapping matrix T 560 is formulated for mapping to a single label form various labels representing the same speech element. For example, both the "r" and "R" labels are mapped to the "r" label. Table 6 (FIG. 41) contains the set of speech elements to which the various label forms are mapped.

FIGS. 36–44, as discussed above, depict all the tables used in labeling phonemes. Table 1, FIG. 36, contains the labels with which the listener may mark the speech associated with the development database. While the notation assigned to the labels may be unconventional, the notation can be duplicated using a standard keyboard. Explanations of the notation are therefore included as part of the table.

The set of labels which may be used by a person marking the speech (Table 1) has been carefully chosen to cover the possible acoustic manifestations of phonemes within the listening windows. Thus the selection of vowels and consonants, in all the various forms exhibited in Table 1, is a set of speech elements that one could hear in the listening windows. The list of speech elements includes more than what one typically refers to as "phonemes", for example, it includes initial forms, bridge forms and final forms of various speech elements.

Table 2, FIG. 37, contains diphone labels and the constituent speech elements. This table is used to separate a speech element estimate vector containing diphone estimates into the two appropriate speech element estimates. The table is used also to generate the combined kernels $K_1$ and $K_2$. Table 2 is also used along with Tables 3–6, FIGS. 38–41 in generating the maps for rearranging and consolidating the phoneme estimates in phoneme estimator integrator 46 (FIG. 35).

Tables 7–9 (FIGS. 42–44) are tables of the speech element labels used in model-1 processor 34, model-2 processor 40 and phoneme rearrangement processor 44, respectively. Table 7 contains the labels corresponding to the elements of kernel $K_1$, Table 8 contains the phoneme isotype labels corresponding to elements of kernel $K_2$ and Table 9 contains the phoneme estimate labels which are applied to data which are manipulated and re-arranged to conform to the requirements of the word/phrase determiner 14 and the word/phrase dictionary 16 (FIG. 1). The labels shown in Table 9 are the phonemes which we believe best characterize the spoken words or phrases in general speech.

The sets of labels used in Tables 1–9 have been carefully chosen to optimize the final phoneme accuracy of the speech recognizer. Thus, the selection of vowel, consonants, diphones and isolated forms, while not a complete set of all such possibilities, is the set which is the most useful for subsequently looking up words in the Word/Phrase Determiner, block 14 of FIG. 1. The tables may be modified to include sounds indicative of subject-related speech, for example, numbers, and also to include sounds present in languages other than English, as appropriate.

HARDWARE CONFIGURATIONS

Figure 45:
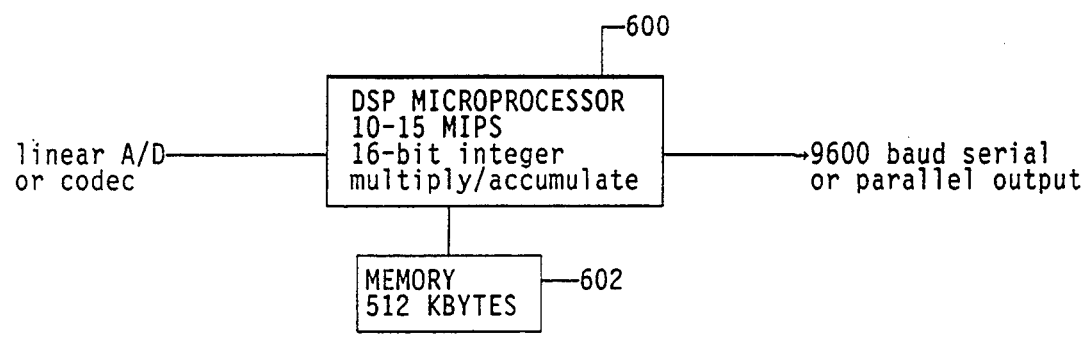
FIG. 45 is a block diagram of a hardware configuration of the speech recognition system of FIGS. 1–2.
Figure 46:
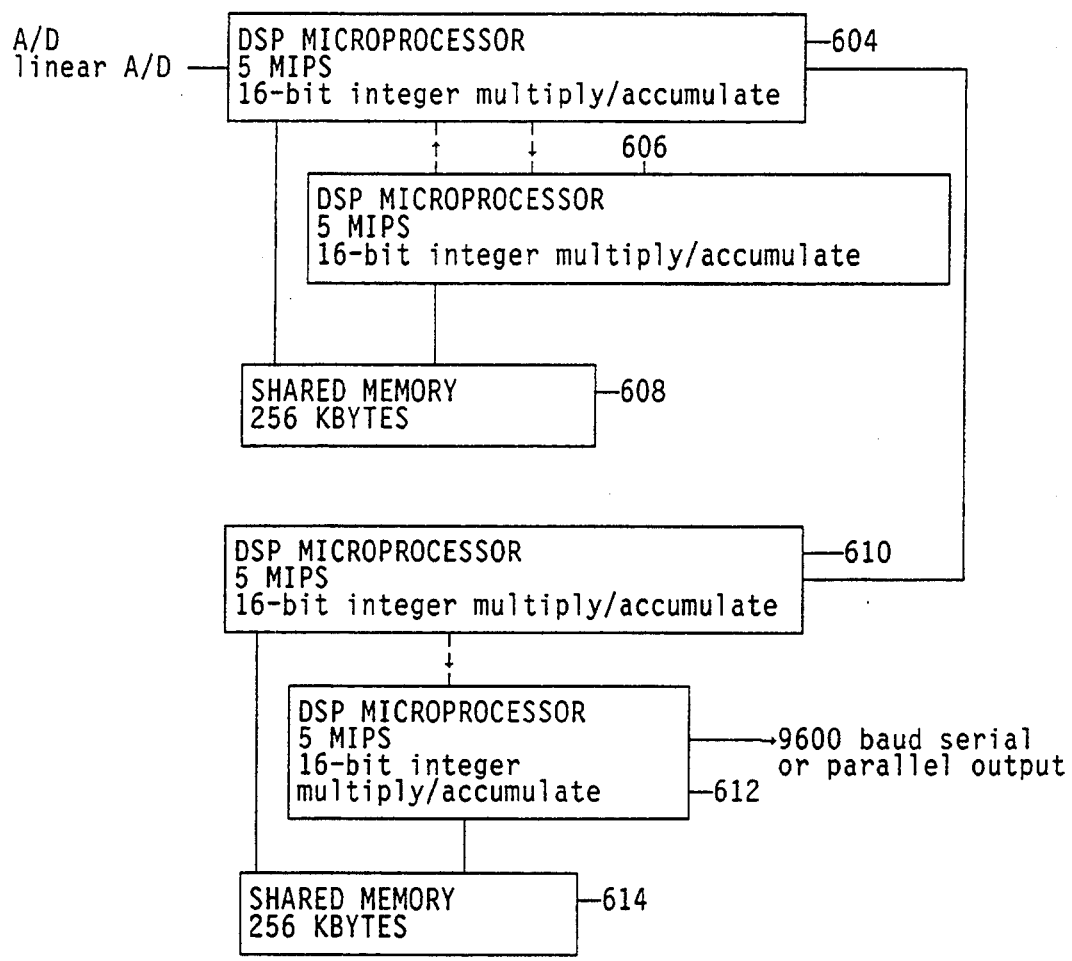
FIG. 46 is a block diagram of a second hardware configuration of the speech-recognition system of FIGS. 1–2.

FIGS. 45–48 depict system hardware configurations 1–4. The first configuration (FIG. 45), including a Digital Signal Processor (DSP) microprocessor 600 and a memory 602, is designed for a software-intensive approach to the current system. A second configuration (FIG. 46) is designed also for a rather software-intensive embodiment. This second configuration, which consists of four DSP's 604, 606, 610 and 612, and two shared memories, 608 and 614, performs the system functions using two memories which are each half as large as the memory in FIG. 45 and DSP's which are two to three times slower than the 10–15 MIPS (millions-of-instructions per second) of DSP 600 (FIG. 45).

Figure 47:
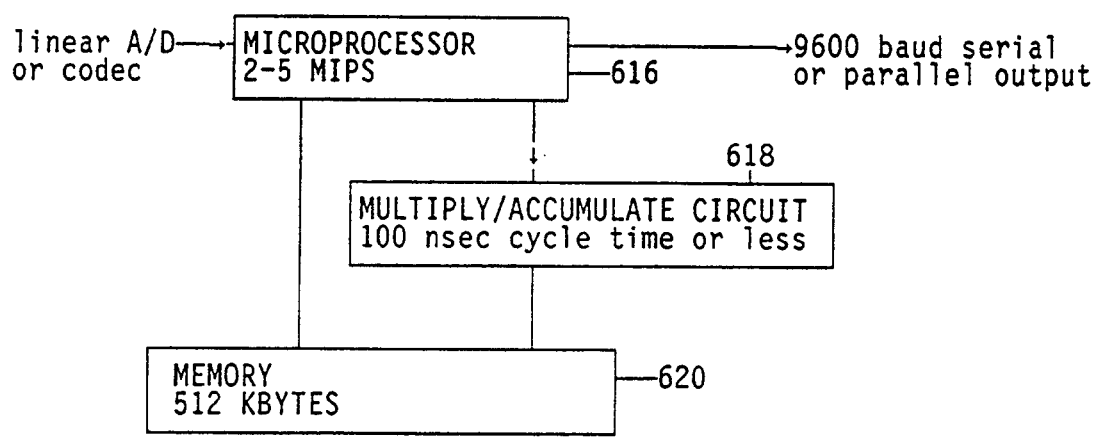
FIG. 47 is a block diagram of a third hardware configuration of the speech-recognition system of FIGS. 1–2.

FIG. 47 depicts a system configuration which is relatively hardware-intensive. This third configuration consists of a 2–5 MIPS microprocessor 616, a memory 620 and a multiply/accumulate circuit 618. The multiply/accumulate circuit performs the rather large matrix multiplication operations. For example, this circuit would multiply the $119 \times 843$-element combined kernel $K_2$ matrix and the 843-element vector $t_n$ 320 (FIG. 14). The microprocessor 616, which performs the other calculations need not be a DSP.

Figure 48:
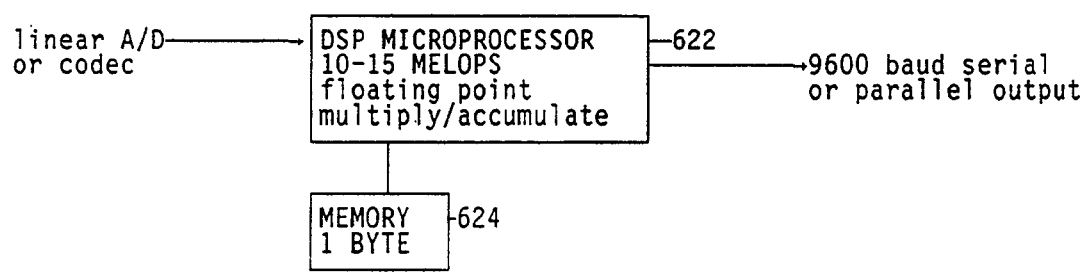
FIG. 48 is a block diagram of a fourth hardware configuration of the speech-recognition system of FIGS. 1–2.

FIG. 48 depicts a floating point system configuration. The system includes 10–15 MFLOPS (millions of floating-point-operations per second) DSP processor 622 and a memory 624 which is twice as large as the memories used in the other systems. The memory 624 is thus capable of storing 32-bit floating point numbers instead of the 16-bit integers used in the other three configurations.

FIG. 49 illustrates how the parameters, the development of which is shown in FIGS. 19–35, are related to the processing system depicted in block diagram form in FIGS. 3–18.

CONCLUSION

The present speech recognition system performs speech-element-specific processing, for example, in speech-element model-1 34 (FIG. 11), in between non-linear processing to manipulate the data into a form which contains recognizable phoneme patterns. Performing speech-element-specific processing at various points in the system allows relatively large amounts of high resolution signal frequency data to be reduced without sacrificing information which is important to phoneme estimation.

If speech-element--specific data reduction processing is not performed at the appropriate place in the system, the resolution of the signal data applied to the nonlinear processors would have to be reduced to limit the number of parameters.

The present system thus retains important, relatively high resolution data for nonlinear processing and eliminates data at various points in the system which, at the point of data reduction, are found to be redundant or relatively unimportant after speech-element-specific processing. If the data reduction and nonlinear processing steps were not so interleaved, the system would be operating on lower resolution data, impairing accuracy.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A method of identifying speech elements of interest in a speech signal, said method comprising the steps of:
   A. converting the speech signal to a sequence of digital quantities;
   B. subjecting the digital quantities to a sequence of digital processing steps including a sequence of vector-processing steps whose outputs are multielement vectors and whose inputs include vector outputs of previous processing steps thereby to generate a first vector with components which are associated with a speech element;
   C. comparing said first vector with a first set of model vectors which are associated with a set of known speech elements, for each comparison of said first vector with one of the model vectors in the first set of model vectors deriving a value representing the degree of similarity between the vectors and generating a second vector with these values as components;
   D. processing said second vector to product a third vector; and
   E. comparing said third vector with a second set of model vectors associated with a set of known speech elements and producing respective speech-element estimate signals that represent the likelihoods that the speech contains the respective known speech elements in the set.

2. A method of recognizing spoken words or phrases in a speech signal, said method comprising the steps of:
   A. receiving an electrical speech signal and converting a segment of the speech signal to a sequence of digital quantities;
   B. subjecting the digital quantities to a sequence of digital processing steps and generating a first vector with components which are associated with a speech element;
   C. comparing said first vector with each vector in a first set of model vectors, where each model vector is associated with a known speech element, the results of such comparisons, which are values representing the degree of similarity between the first vector and each of the model vectors in said first set of model vectors, being accumulated as the components of a second vector;
   D. comparing a third vector derived from said second vector with a second set of model vectors that are associated with known speech elements and producing respective speech-element estimate signals that represent the likelihoods that the speech contains the respective known speech elements;
   E. repeating steps A through D for successive segments of the speech signal which are associated with a spoken word or phrase; and
   F. combining the speech element estimate signals produced in step D to form combination signals; and
   G. in response to the combination signals identifying words or phrases corresponding to the speech signal.

* * * * *